US011778099B2

(12) United States Patent
Munoz et al.

(10) Patent No.: US 11,778,099 B2
(45) Date of Patent: Oct. 3, 2023

(54) SYSTEMS AND METHODS RELATING TO PREDICTIVE ROUTING AND OCCUPANCY BALANCING

(71) Applicant: Genesys Cloud Services, Inc., Menlo Park, CA (US)

(72) Inventors: Emir Munoz, Galway (IE); Maciej Dabrowski, Galway (IE); Rory McTigue, Galway (IE); David Farrell, Galway (IE)

(73) Assignee: Genesys Cloud Services, Inc., Menlo Park, CA (US)

( * ) Notice: Subject to any disclaimer, the term of this patent is extended or adjusted under 35 U.S.C. 154(b) by 0 days.

(21) Appl. No.: 17/740,061

(22) Filed: May 9, 2022

(65) Prior Publication Data
US 2022/0360669 A1    Nov. 10, 2022

Related U.S. Application Data

(60) Provisional application No. 63/185,716, filed on May 7, 2021.

(51) Int. Cl.
*H04M 3/00*    (2006.01)
*H04M 3/523*    (2006.01)
*G06Q 10/0639*    (2023.01)

(52) U.S. Cl.
CPC .... *H04M 3/5233* (2013.01); *G06Q 10/06393* (2013.01); *H04M 3/5238* (2013.01)

(58) Field of Classification Search
CPC .............. H04M 3/5233; H04M 3/5238; G06Q 10/06393
See application file for complete search history.

(56) References Cited

U.S. PATENT DOCUMENTS

| 8,824,655 | B2 | 9/2014 | Bobba et al. |
|---|---|---|---|
| 2008/0071917 | A1 | 3/2008 | Petrovykh |
| 2010/0086120 | A1 | 4/2010 | Brussat et al. |
| 2015/0201077 | A1 | 7/2015 | Konig et al. |
| 2017/0111507 | A1 | 4/2017 | McGann et al. |
| 2019/0037077 | A1 | 1/2019 | Konig et al. |

OTHER PUBLICATIONS

International Search Report and Written Opinion of the International Searching Authority; ISA/US; International Application No. PCT/US2022/028369; dated Sep. 12, 2022; 11 pages.

*Primary Examiner* — Rasha S Al Aubaidi
(74) *Attorney, Agent, or Firm* — Taft Stettinius & Hollister LLP

(57) ABSTRACT

A method of routing interactions to contact center agents according to an embodiment includes identifying an interaction to be routed to a contact center agent, identifying a group of contact center agents as candidates for routing of the interaction, retrieving agent performance data for each candidate agent of the group of contact center agents identified as candidates for routing of the interaction, determining a predicted score for a key performance indicator for each candidate agent based on the agent performance data, determining an occupancy rate of each candidate agent based on the agent performance data, generating a ranking of the candidate agents for routing prioritization based on the predicted score for the key performance indicator for each candidate agent and the occupancy rate of each candidate agent, and signaling a routing device to route the interaction to a selected candidate agent based on the ranking of the candidate agents.

17 Claims, 8 Drawing Sheets

SYSTEMS AND METHODS RELATING TO PREDICTIVE ROUTING AND OCCUPANCY BALANCING

CROSS-REFERENCE TO RELATED APPLICATIONS

This application claims priority to and the benefit of U.S. Provisional Application No. 63/185,716, titled "Systems and Methods Relating to Predictive Routing and Occupancy Balancing," filed on May 7, 2021, the contents of which are incorporated herein by reference in their entirety.

BACKGROUND

Call centers and other contact centers are used by many organizations to provide technical and other support to their end users. The end user may interact with human and/or virtual agents of the contact center by establishing electronic communications via one or more communication technologies including, for example, telephone, email, web chat, Short Message Service (SMS), dedicated software application(s), and/or other technologies. Contact centers may have a substantial number of agents in order to efficiently respond to end user queries and, therefore, contact centers use some mechanism to route communications or interactions to an appropriate agent

SUMMARY

One embodiment is directed to a unique system, components, and methods for routing interactions to contact center agents. Other embodiments are directed to apparatuses, systems, devices, hardware, methods, and combinations thereof for routing interactions to contact center agents.

According to an embodiment, a system for routing interactions to contact center agents may include at least one processor and at least one memory comprising a plurality of instructions stored therein that, in response to execution by the at least one processor, causes the system to identify an interaction to be routed to a contact center agent, identify a group of contact center agents as candidates for routing of the interaction, retrieve agent performance data for each candidate agent of the group of contact center agents identified as candidates for routing of the interaction, determine a predicted score for a key performance indicator for each candidate agent based on the agent performance data, determine an occupancy rate of each candidate agent based on the agent performance data, generate a ranking of the candidate agents for routing prioritization based on the predicted score for the key performance indicator for each candidate agent and the occupancy rate of each candidate agent, and signal a routing device to route the interaction to a selected candidate agent based on the ranking of the candidate agents.

In some embodiments, to generate the ranking of the candidate agents for routing prioritization may include to generate a modified predicted score for each candidate agent based on the predicted score for the key performance indicator and the occupancy rate for the corresponding candidate agent, and rank the candidate agents for routing prioritization based on the modified predicted score for each candidate agent.

In some embodiments, to generate the modified predicted score for a corresponding candidate agent may include to increase the predicted score for the corresponding candidate agent in response to a determination that the occupancy rate of the corresponding candidate agent is less than a first threshold, and decrease the predicted score for the corresponding candidate agent in response to a determination that the occupancy rate of the corresponding candidate agent is greater than a second threshold.

In some embodiments, to generate the modified predicted score for a corresponding candidate agent may include to multiply the predicted score for the corresponding candidate agent by a real number greater than one in response to a determination that the occupancy rate of the corresponding candidate agent is less than a first threshold, and multiply the predicted score for the corresponding candidate agent by a real number between zero and one in response to a determination that the occupancy rate of the corresponding candidate agent is greater than a second threshold.

In some embodiments, to generate the modified predicted score for a corresponding candidate agent may include to divide the predicted score for the corresponding candidate agent by an availability rate of the corresponding candidate agent, and the availability rate of the corresponding candidate agent may be equal to one minus the occupancy rate of the corresponding candidate agent.

In some embodiments, to generate the modified predicted score for a corresponding candidate agent may include to multiply the occupancy rate of the corresponding candidate by a weighting factor to generate a modified occupancy rate for the corresponding candidate agent, calculate a modified availability rate of the corresponding candidate agent as one minus the modified occupancy rate of the corresponding candidate agent, and divide the predicted score for the corresponding candidate agent by the modified availability rate of the corresponding candidate agent.

In some embodiments, the system may include a contact center system, and the weighting factor may be modifiable by an administrator of the contact center system.

In some embodiments, the key performance indicator of a corresponding candidate agent may be an average handle time (AHT) of the candidate agent.

In some embodiments, the predicted score for the key performance indicator may be a normalized value between zero and one hundred.

According to another embodiment, a method of routing interactions to contact center agents in a contact center system may include identifying an interaction to be routed to a contact center agent, identifying a group of contact center agents as candidates for routing of the interaction, retrieving agent performance data for each candidate agent of the group of contact center agents identified as candidates for routing of the interaction, determining a predicted score for a key performance indicator for each candidate agent based on the agent performance data, determining an occupancy rate of each candidate agent based on the agent performance data, generating a ranking of the candidate agents for routing prioritization based on the predicted score for the key performance indicator for each candidate agent and the occupancy rate of each candidate agent, and signaling a routing device to route the interaction to a selected candidate agent based on the ranking of the candidate agents.

In some embodiments, generating the ranking of the candidate agents for routing prioritization may include generating a modified predicted score for each candidate agent based on the predicted score for the key performance indicator and the occupancy rate for the corresponding candidate agent, and ranking the candidate agents for routing prioritization based on the modified predicted score for each candidate agent.

In some embodiments, generating the modified predicted score for a corresponding candidate agent may include increasing the predicted score for the corresponding candidate agent in response to determining that the occupancy rate of the corresponding candidate agent is less than a first threshold, and decreasing the predicted score for the corresponding candidate agent in response to determining that the occupancy rate of the corresponding candidate agent is greater than a second threshold.

In some embodiments, generating the modified predicted score for a corresponding candidate agent may include multiplying the predicted score for the corresponding candidate agent by a real number greater than one in response to determining that the occupancy rate of the corresponding candidate agent is less than a first threshold, and multiplying the predicted score for the corresponding candidate agent by a real number between zero and one in response to determining that the occupancy rate of the corresponding candidate agent is greater than a second threshold.

In some embodiments, generating the modified predicted score for a corresponding candidate agent may include dividing the predicted score for the corresponding candidate agent by an availability rate of the corresponding candidate agent, and the availability rate of the corresponding candidate agent may be equal to one minus the occupancy rate of the corresponding candidate agent.

In some embodiments, generating the modified predicted score for a corresponding candidate agent may include multiplying the occupancy rate of the corresponding candidate by a weighting factor to generate a modified occupancy rate for the corresponding candidate agent, calculating a modified availability rate of the corresponding candidate agent as one minus the modified occupancy rate of the corresponding candidate agent, and dividing the predicted score for the corresponding candidate agent by the modified availability rate of the corresponding candidate agent.

In some embodiments, the method may further include modifying the weighting factor by an administrator of the contact center system.

In some embodiments, the key performance indicator of a corresponding candidate agent may be an average handle time (AHT) of the candidate agent.

In some embodiments, the predicted score for the key performance indicator may be a normalized value between zero and one hundred.

According to yet another embodiment, one or more non-transitory machine readable storage media may include a plurality of instructions stored thereon that, in response to execution by a system, causes the system to identify an interaction to be routed to a contact center agent, identify a group of contact center agents as candidates for routing of the interaction, retrieve agent performance data for each candidate agent of the group of contact center agents identified as candidates for routing of the interaction, determine a predicted score for a key performance indicator for each candidate agent based on the agent performance data, determine an occupancy rate of each candidate agent based on the agent performance data, generate a ranking of the candidate agents for routing prioritization based on the predicted score for the key performance indicator for each candidate agent and the occupancy rate of each candidate agent, and signal a routing device to route the interaction to a selected candidate agent based on the ranking of the candidate agents.

In some embodiments, to generate the ranking of the candidate agents for routing prioritization may include to generate a modified predicted score for each candidate agent based on the predicted score for the key performance indicator and the occupancy rate for the corresponding candidate agent, and rank the candidate agents for routing prioritization based on the modified predicted score for each candidate agent.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
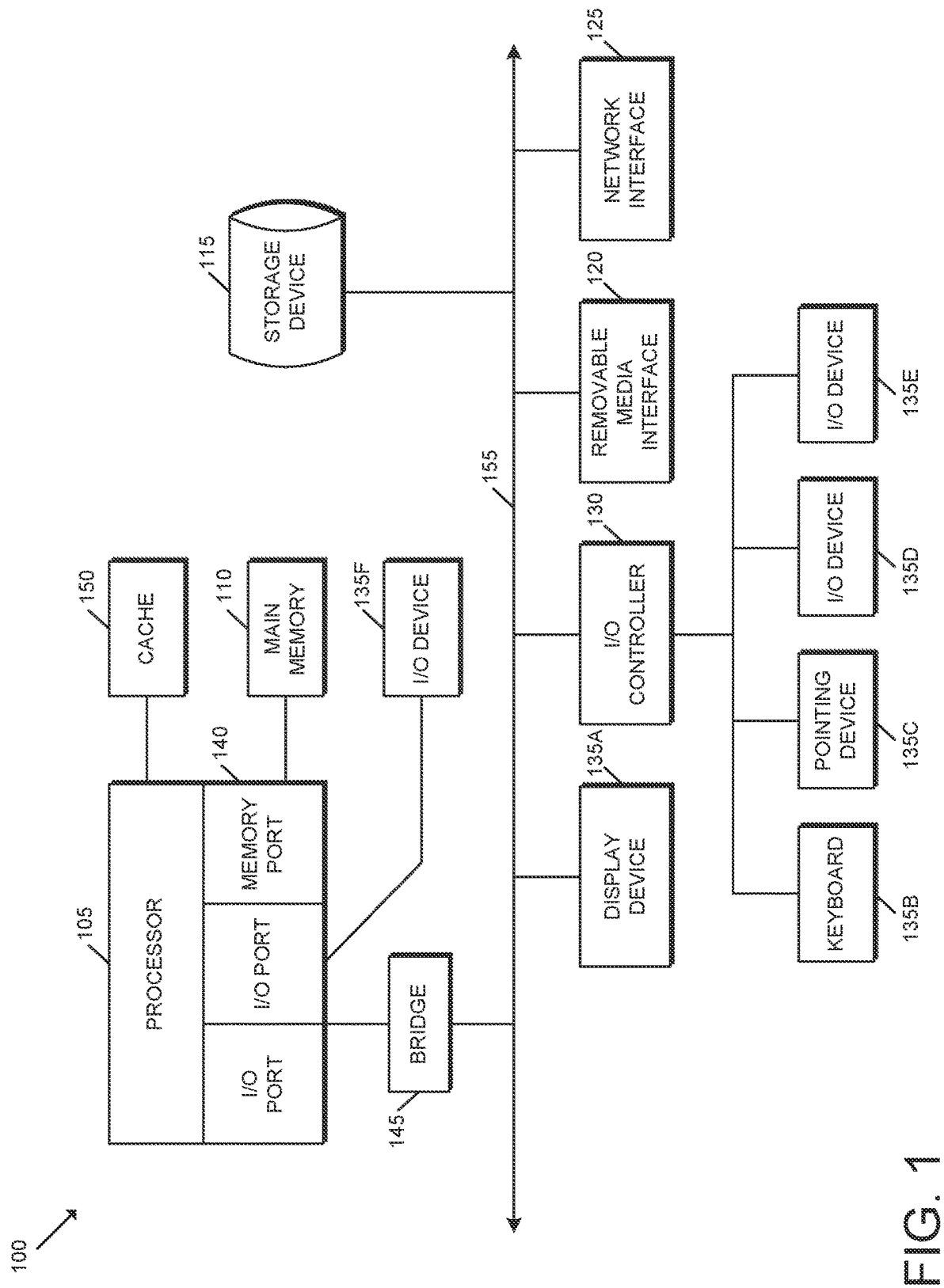
FIG. 1 is a simplified block diagram of at least one embodiment of a computing device.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should be further appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Further, particular features, structures, or characteristics may be combined in any suitable combinations and/or sub-combinations in various embodiments.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Referring now to FIG. 1, a simplified block diagram of at least one embodiment of a computing device 100 is shown. The illustrative computing device 100 depicts at least one embodiment of each of the computing devices, systems, servicers, controllers, switches, gateways, engines, modules, and/or computing components described herein (e.g., which collectively may be referred to interchangeably as computing devices, servers, or modules for brevity of the description). For example, the servers may be a process or thread running on one or more processors of one or more computing devices 100, which may be executing computer program instructions and interacting with other system modules in order to perform the various functionalities described herein.

Unless otherwise specifically limited, the functionality described in relation to a plurality of computing devices may be integrated into a single computing device, or the various functionalities described in relation to a single computing device may be distributed across several computing devices. Further, in relation to the computing systems described herein—such as the contact center system 200 of FIG. 2—the various servers and computing devices thereof may be located on local computing devices 100 (e.g., on-site at the same physical location as the agents of the contact center), remote computing devices 100 (e.g., off-site or in a cloud-based or cloud computing environment, for example, in a remote data center connected via a network), or some combination thereof. In some embodiments, functionality provided by servers located on computing devices off-site may be accessed and provided over a virtual private network (VPN), as if such servers were on-site, or the functionality may be provided using a software as a service (SaaS) accessed over the Internet using various protocols, such as by exchanging data via extensible markup language (XML), JSON, and/or the functionality may be otherwise accessed/leveraged.

As shown in the illustrated example, the computing device 100 may include a central processing unit (CPU) or processor 105 and a main memory 110. The computing device 100 may also include a storage device 115, a removable media interface 120, a network interface 125, an input/output (I/O) controller 130, and one or more input/output (I/O) devices 135. For example, as depicted, the I/O devices 135 may include a display device 135A, a keyboard 135B, and/or a pointing device 135C. The computing device 100 may further include additional elements, such as a memory port 140, a bridge 145, one or more I/O ports, one or more additional input/output (I/O) devices 135D, 135E, 135F, and/or a cache memory 150 in communication with the processor 105.

The processor 105 may be any logic circuitry that responds to and processes instructions fetched from the main memory 110. For example, the processor 105 may be implemented by an integrated circuit (e.g., a microprocessor, microcontroller, or graphics processing unit), or in a field-programmable gate array (FPGA) or application-specific integrated circuit (ASIC). As depicted, the processor 105 may communicate directly with the cache memory 150 via a secondary bus or backside bus. It should be appreciated that the cache memory 150 typically has a faster response time than the main memory 110. The main memory 110 may be one or more memory chips capable of storing data and allowing stored data to be directly accessed by the processor 105. The storage device 115 may provide storage for an operating system, which controls scheduling tasks and access to system resources, and other software. Unless otherwise limited, the computing device 100 may include an operating system and software capable of performing the functionality described herein.

As depicted in the illustrated example, the computing device 100 may include a wide variety of I/O devices 135, one or more of which may be connected via the I/O controller 130. Input devices may include, for example, a keyboard 135B and a pointing device 135C (e.g., a mouse or optical pen). Output devices may include, for example, video display devices, speakers, and printers. The I/O devices 135 and/or the I/O controller 130 may include suitable hardware and/or software for enabling the use of multiple display devices. The computing device 100 may also support one or more removable media interfaces 120, such as a disk drive, USB port, or any other device suitable for reading data from or writing data to computer readable media. More generally, the I/O devices 135 may include any conventional devices for performing the functionality described herein.

The computing device 100 may be any workstation, desktop computer, laptop or notebook computer, server machine, virtualized machine, mobile or smart phone, portable telecommunication device, media playing device, gaming system, mobile computing device, or any other type of computing, telecommunications or media device, without limitation, capable of performing the operations and functionality described herein. Although described in the singular for clarity and brevity of the description, the computing device 100 may include a plurality of devices connected by a network or connected to other systems and resources via a network. As used herein, a network may be embodied as or include one or more computing devices, machines, clients, client nodes, client machines, client computers, client devices, endpoints, or endpoint nodes in communication with one or more other computing devices, machines, clients, client nodes, client machines, client computers, client devices, endpoints, or endpoint nodes. For example, the network may be embodied as or include a private or public switched telephone network (PSTN), wireless carrier network, local area network (LAN), private wide area network (WAN), public WAN such as the Internet, etc., with connections being established using appropriate communication protocols. More generally, it should be understood that, unless otherwise limited, the computing device 100 may communicate with other computing devices 100 via any type of network using any suitable communication protocol. Further, the network may be a virtual network environment where various network components are virtualized. For example, the various machines may be virtual machines implemented as a software-based computer running on a physical machine, or a "hypervisor" type of virtualization may be used where multiple virtual machines run on the same host physical machine. Other types of virtualization may be employed in other embodiments.

Figure 2:
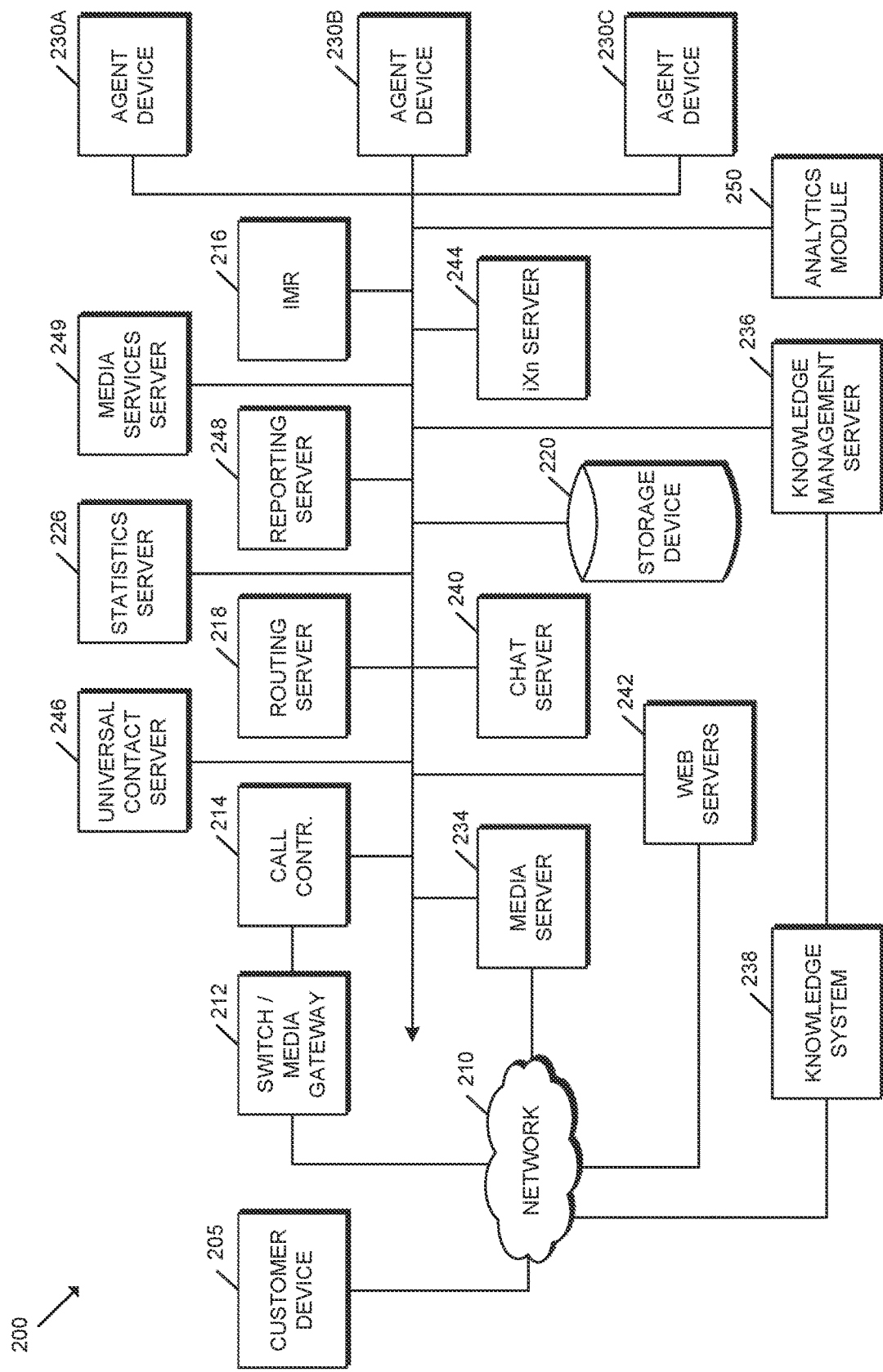
FIG. 2 is a simplified block diagram of at least one embodiment of a contact center system and/or communications infrastructure.

Referring now to FIG. 2, a simplified block diagram of at least one embodiment of a communications infrastructure and/or content center system, which may be used in conjunction with one or more of the embodiments described herein, is shown. The contact center system 200 may be embodied as any system capable of providing contact center services (e.g., call center services, chat center services, SMS center services, etc.) to an end user and otherwise performing the functions described herein. The illustrative contact center system 200 includes a customer device 205, a network 210, a switch/media gateway 212, a call controller 214, an interactive media response (IMR) server 216, a routing server 218, a storage device 220, a statistics server 226, agent devices 230A, 230B, 230C, a media server 234, a knowledge management server 236, a knowledge system 238, chat server 240, web servers 242, an interaction (iXn) server 244, a universal contact server 246, a reporting server 248, a media services server 249, and an analytics module 250. Although only one customer device 205, one network 210, one switch/media gateway 212, one call controller 214, one IMR server 216, one routing server 218, one storage device 220, one statistics server 226, one media server 234, one knowledge management server 236, one knowledge system 238, one chat server 240, one iXn server 244, one universal contact server 246, one reporting server 248, one media services server 249, and one analytics module 250 are shown in the illustrative embodiment of FIG. 2, the contact center system 200 may include multiple customer devices 205, networks 210, switch/media gateways 212, call controllers 214, IMR servers 216, routing servers 218, storage devices 220, statistics servers 226, media servers 234, knowledge management servers 236, knowledge systems 238, chat servers 240, iXn servers 244, universal contact servers 246, reporting servers 248, media services servers 249, and/or analytics modules 250 in other embodiments. Further, in some embodiments, one or more of the components described herein may be excluded from the system 200, one or more of the components described as being independent may form a portion of another component, and/or one or more of the components described as forming a portion of another component may be independent.

It should be understood that the term "contact center system" is used herein to refer to the system depicted in FIG. 2 and/or the components thereof, while the term "contact center" is used more generally to refer to contact center systems, customer service providers operating those systems, and/or the organizations or enterprises associated therewith. Thus, unless otherwise specifically limited, the term "contact center" refers generally to a contact center system (such as the contact center system 200), the associated customer service provider (such as a particular customer service provider providing customer services through the contact center system 200), as well as the organization or enterprise on behalf of which those customer services are being provided.

By way of background, customer service providers may offer many types of services through contact centers. Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "individuals" or "customers"). For example, the agents at a contact center may assist customers in making purchasing decisions, receiving orders, or solving problems with products or services already received. Within a contact center, such interactions between contact center agents and outside entities or customers may be conducted over a variety of communication channels, such as, for example, via voice (e.g., telephone calls or voice over IP or VoIP calls), video (e.g., video conferencing), text (e.g., emails and text chat), screen sharing, co-browsing, and/or other communication channels.

Operationally, contact centers generally strive to provide quality services to customers while minimizing costs. For example, one way for a contact center to operate is to handle every customer interaction with a live agent. While this approach may score well in terms of the service quality, it likely would also be prohibitively expensive due to the high cost of agent labor. Because of this, most contact centers utilize some level of automated processes in place of live agents, such as, for example, interactive voice response (IVR) systems, interactive media response (IMR) systems, internet robots or "bots", automated chat modules or "chatbots", and/or other automated processed. In many cases, this has proven to be a successful strategy, as automated processes can be highly efficient in handling certain types of interactions and effective at decreasing the need for live agents. Such automation allows contact centers to target the use of human agents for the more difficult customer interactions, while the automated processes handle the more repetitive or routine tasks. Further, automated processes can be structured in a way that optimizes efficiency and promotes repeatability. Whereas a human or live agent may forget to ask certain questions or follow-up on particular details, such mistakes are typically avoided through the use of automated processes. While customer service providers are increasingly relying on automated processes to interact with customers, the use of such technologies by customers remains far less developed. Thus, while IVR systems, IMR systems, and/or bots are used to automate portions of the interaction on the contact center-side of an interaction, the actions on the customer-side remain for the customer to perform manually.

It should be appreciated that the contact center system 200 may be used by a customer service provider to provide various types of services to customers. For example, the contact center system 200 may be used to engage and manage interactions in which automated processes (or bots) or human agents communicate with customers. As should be understood, the contact center system 200 may be an in-house facility to a business or enterprise for performing the functions of sales and customer service relative to products and services available through the enterprise. In another embodiment, the contact center system 200 may be operated by a third-party service provider that contracts to provide services for another organization. Further, the contact center system 200 may be deployed on equipment dedicated to the enterprise or third-party service provider, and/or deployed in a remote computing environment such as, for example, a private or public cloud environment with infrastructure for supporting multiple contact centers for multiple enterprises. The contact center system 200 may include software applications or programs, which may be executed on premises or remotely or some combination thereof. It should further be appreciated that the various components of the contact center system 200 may be distributed across various geographic locations and not necessarily contained in a single location or computing environment.

It should further be understood that, unless otherwise specifically limited, any of the computing elements of the technologies described herein may be implemented in cloud-based or cloud computing environments. As used herein and further described below in reference to the computing device 400, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Often referred to as a "serverless architecture," a cloud execution model generally includes a service provider dynamically managing an allocation and provisioning of remote servers for achieving a desired functionality.

It should be understood that any of the computer-implemented components, modules, or servers described in relation to FIG. 2 may be implemented via one or more types of computing devices, such as, for example, the computing device 100 of FIG. 1. As will be seen, the contact center system 200 generally manages resources (e.g., personnel, computers, telecommunication equipment, etc.) to enable delivery of services via telephone, email, chat, or other communication mechanisms. Such services may vary depending on the type of contact center and, for example, may include customer service, help desk functionality, emergency response, telemarketing, order taking, and/or other characteristics.

Customers desiring to receive services from the contact center system 200 may initiate inbound communications (e.g., telephone calls, emails, chats, etc.) to the contact center system 200 via a customer device 205. While FIG. 2 shows one such customer device—i.e., customer device 205—it should be understood that any number of customer devices 205 may be present. The customer devices 205, for example, may be a communication device, such as a telephone, smart phone, computer, tablet, or laptop. In accordance with functionality described herein, customers may generally use the customer devices 205 to initiate, manage, and conduct communications with the contact center system 200, such as telephone calls, emails, chats, text messages, web-browsing sessions, and other multi-media transactions.

Inbound and outbound communications from and to the customer devices 205 may traverse the network 210, with the nature of the network typically depending on the type of customer device being used and the form of communication. As an example, the network 210 may include a communication network of telephone, cellular, and/or data services. The network 210 may be a private or public switched telephone network (PSTN), local area network (LAN), private wide area network (WAN), and/or public WAN such as the Internet. Further, the network 210 may include a wireless carrier network including a code division multiple access (CDMA) network, global system for mobile communications (GSM) network, or any wireless network/technology conventional in the art, including but not limited to 3G, 4G, LTE, 5G, etc.

The switch/media gateway 212 may be coupled to the network 210 for receiving and transmitting telephone calls between customers and the contact center system 200. The switch/media gateway 212 may include a telephone or communication switch configured to function as a central switch for agent level routing within the center. The switch may be a hardware switching system or implemented via software. For example, the switch 212 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, one of the agent devices 230. Thus, in general, the switch/media gateway 212 establishes a voice connection between the customer and the agent by establishing a connection between the customer device 205 and agent device 230.

As further shown, the switch/media gateway 212 may be coupled to the call controller 214 which, for example, serves as an adapter or interface between the switch and the other routing, monitoring, and communication-handling components of the contact center system 200. The call controller 214 may be configured to process PSTN calls, VoIP calls, and/or other types of calls. For example, the call controller 214 may include computer-telephone integration (CTI) software for interfacing with the switch/media gateway and other components. The call controller 214 may include a session initiation protocol (SIP) server for processing SIP calls. The call controller 214 may also extract data about an incoming interaction, such as the customer's telephone number, IP address, or email address, and then communicate these with other contact center components in processing the interaction.

The interactive media response (IMR) server 216 may be configured to enable self-help or virtual assistant functionality. Specifically, the IMR server 216 may be similar to an interactive voice response (IVR) server, except that the IMR server 216 is not restricted to voice and may also cover a variety of media channels. In an example illustrating voice, the IMR server 216 may be configured with an IMR script for querying customers on their needs. For example, a contact center for a bank may instruct customers via the IMR script to "press 1" if they wish to retrieve their account balance. Through continued interaction with the IMR server 216, customers may receive service without needing to speak with an agent. The IMR server 216 may also be configured to ascertain why a customer is contacting the contact center so that the communication may be routed to the appropriate resource. The IMR configuration may be performed through the use of a self-service and/or assisted service tool which comprises a web-based tool for developing IVR applications and routing applications running in the contact center environment (e.g. Genesys® Designer).

The routing server 218 may function to route incoming interactions. For example, once it is determined that an inbound communication should be handled by a human agent, functionality within the routing server 218 may select the most appropriate agent and route the communication thereto. This agent selection may be based on which available agent is best suited for handling the communication. More specifically, the selection of appropriate agent may be based on a routing strategy or algorithm that is implemented by the routing server 218. In doing this, the routing server 218 may query data that is relevant to the incoming interaction, for example, data relating to the particular customer, available agents, and the type of interaction, which, as described herein, may be stored in particular databases. Once the agent is selected, the routing server 218 may interact with the call controller 214 to route (i.e., connect) the incoming interaction to the corresponding agent device 230. As part of this connection, information about the customer may be provided to the selected agent via their agent device 230. This information is intended to enhance the service the agent is able to provide to the customer.

It should be appreciated that the contact center system 200 may include one or more mass storage devices—represented generally by the storage device 220—for storing data in one or more databases relevant to the functioning of the contact center. For example, the storage device 220 may store customer data that is maintained in a customer database. Such customer data may include, for example, customer profiles, contact information, service level agreement (SLA), and interaction history (e.g., details of previous interactions with a particular customer, including the nature of previous interactions, disposition data, wait time, handle time, and actions taken by the contact center to resolve customer issues). As another example, the storage device 220 may store agent data in an agent database. Agent data maintained by the contact center system 200 may include, for example, agent availability and agent profiles, schedules, skills, handle time, and/or other relevant data. As another example, the storage device 220 may store interaction data in an interaction database. Interaction data may include, for example, data relating to numerous past interactions between customers and contact centers. More generally, it should be understood that, unless otherwise specified, the storage device 220 may be configured to include databases and/or store data related to any of the types of information described herein, with those databases and/or data being accessible to the other modules or servers of the contact center system 200 in ways that facilitate the functionality described herein. For example, the servers or modules of the contact center system 200 may query such databases to retrieve data stored therein or transmit data thereto for storage. The storage device 220, for example, may take the form of any conventional storage medium and may be locally housed or operated from a remote location. As an example, the databases may be Cassandra database, NoSQL database, or a SQL database and managed by a database management system, such as, Oracle, IBM DB2, Microsoft SQL server, or Microsoft Access, PostgreSQL.

The statistics server 226 may be configured to record and aggregate data relating to the performance and operational aspects of the contact center system 200. Such information may be compiled by the statistics server 226 and made available to other servers and modules, such as the reporting server 248, which then may use the data to produce reports that are used to manage operational aspects of the contact center and execute automated actions in accordance with functionality described herein. Such data may relate to the state of contact center resources, e.g., average wait time, abandonment rate, agent occupancy, and others as functionality described herein would require.

The agent devices 230 of the contact center system 200 may be communication devices configured to interact with the various components and modules of the contact center system 200 in ways that facilitate functionality described herein. An agent device 230, for example, may include a telephone adapted for regular telephone calls or VoIP calls. An agent device 230 may further include a computing device configured to communicate with the servers of the contact center system 200, perform data processing associated with operations, and interface with customers via voice, chat, email, and other multimedia communication mechanisms according to functionality described herein. Although FIG. 2 shows three such agent devices 230—i.e., agent devices 230A, 230B and 230C—it should be understood that any number of agent devices 230 may be present in a particular embodiment.

The multimedia/social media server 234 may be configured to facilitate media interactions (other than voice) with the customer devices 205 and/or the servers 242. Such media interactions may be related, for example, to email, voice mail, chat, video, text-messaging, web, social media, co-browsing, etc. The multi-media/social media server 234 may take the form of any IP router conventional in the art with specialized hardware and software for receiving, processing, and forwarding multi-media events and communications.

The knowledge management server 236 may be configured to facilitate interactions between customers and the knowledge system 238. In general, the knowledge system 238 may be a computer system capable of receiving questions or queries and providing answers in response. The knowledge system 238 may be included as part of the contact center system 200 or operated remotely by a third party. The knowledge system 238 may include an artificially intelligent computer system capable of answering questions posed in natural language by retrieving information from information sources such as encyclopedias, dictionaries, newswire articles, literary works, or other documents submitted to the knowledge system 238 as reference materials. As an example, the knowledge system 238 may be embodied as IBM Watson or a similar system.

The chat server 240, it may be configured to conduct, orchestrate, and manage electronic chat communications with customers. In general, the chat server 240 is configured to implement and maintain chat conversations and generate chat transcripts. Such chat communications may be conducted by the chat server 240 in such a way that a customer communicates with automated chatbots, human agents, or both. In exemplary embodiments, the chat server 240 may perform as a chat orchestration server that dispatches chat conversations among the chatbots and available human agents. In such cases, the processing logic of the chat server 240 may be rules driven so to leverage an intelligent workload distribution among available chat resources. The chat server 240 further may implement, manage, and facilitate user interfaces (UIs) associated with the chat feature, including those UIs generated at either the customer device 205 or the agent device 230. The chat server 240 may be configured to transfer chats within a single chat session with a particular customer between automated and human sources such that, for example, a chat session transfers from a chatbot to a human agent or from a human agent to a chatbot. The chat server 240 may also be coupled to the knowledge management server 236 and the knowledge systems 238 for receiving suggestions and answers to queries posed by customers during a chat so that, for example, links to relevant articles can be provided.

The web servers 242 may be included to provide site hosts for a variety of social interaction sites to which customers subscribe, such as Facebook, Twitter, Instagram, etc. Though depicted as part of the contact center system 200, it should be understood that the web servers 242 may be provided by third parties and/or maintained remotely. The web servers 242 may also provide webpages for the enterprise or organization being supported by the contact center system 200. For example, customers may browse the webpages and receive information about the products and services of a particular enterprise. Within such enterprise webpages, mechanisms may be provided for initiating an interaction with the contact center system 200, for example, via web chat, voice, or email. An example of such a mechanism is a widget, which can be deployed on the webpages or websites hosted on the web servers 242. As used herein, a widget refers to a user interface component that performs a particular function. In some implementations, a widget may include a graphical user interface control that can be overlaid on a webpage displayed to a customer via the Internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Some widgets can include corresponding or additional user interfaces and be configured to access a variety of local resources (e.g., a calendar or contact information on the customer device) or remote resources via network (e.g., instant messaging, electronic mail, or social networking updates).

The interaction (iXn) server 244 may be configured to manage deferrable activities of the contact center and the routing thereof to human agents for completion. As used herein, deferrable activities may include back-office work that can be performed off-line, e.g., responding to emails, attending training, and other activities that do not entail real-time communication with a customer. As an example, the interaction (iXn) server 244 may be configured to interact with the routing server 218 for selecting an appropriate agent to handle each of the deferrable activities. Once assigned to a particular agent, the deferrable activity is pushed to that agent so that it appears on the agent device 230 of the selected agent. The deferrable activity may appear in a workbin as a task for the selected agent to complete. The functionality of the workbin may be implemented via any conventional data structure, such as, for example, a linked list, array, and/or other suitable data structure. Each of the agent devices 230 may include a workbin. As an example, a workbin may be maintained in the buffer memory of the corresponding agent device 230.

The universal contact server (UCS) 246 may be configured to retrieve information stored in the customer database and/or transmit information thereto for storage therein. For example, the UCS 246 may be utilized as part of the chat feature to facilitate maintaining a history on how chats with a particular customer were handled, which then may be used as a reference for how future chats should be handled. More generally, the UCS 246 may be configured to facilitate maintaining a history of customer preferences, such as preferred media channels and best times to contact. To do this, the UCS 246 may be configured to identify data pertinent to the interaction history for each customer such as, for example, data related to comments from agents, customer communication history, and the like. Each of these data types then may be stored in the customer database 222 or on other modules and retrieved as functionality described herein requires.

The reporting server 248 may be configured to generate reports from data compiled and aggregated by the statistics server 226 or other sources. Such reports may include near real-time reports or historical reports and concern the state of contact center resources and performance characteristics, such as, for example, average wait time, abandonment rate, and/or agent occupancy. The reports may be generated automatically or in response to specific requests from a requestor (e.g., agent, administrator, contact center application, etc.). The reports then may be used toward managing the contact center operations in accordance with functionality described herein.

The media services server 249 may be configured to provide audio and/or video services to support contact center features. In accordance with functionality described herein, such features may include prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, keyword spotting, and/or other relevant features.

The analytics module 250 may be configured to provide systems and methods for performing analytics on data received from a plurality of different data sources as functionality described herein may require. In accordance with example embodiments, the analytics module 250 also may generate, update, train, and modify predictors or models based on collected data, such as, for example, customer data, agent data, and interaction data. The models may include behavior models of customers or agents. The behavior models may be used to predict behaviors of, for example, customers or agents, in a variety of situations, thereby allowing embodiments of the technologies described herein to tailor interactions based on such predictions or to allocate resources in preparation for predicted characteristics of future interactions, thereby improving overall contact center performance and the customer experience. It will be appreciated that, while the analytics module is described as being part of a contact center, such behavior models also may be implemented on customer systems (or, as also used herein, on the "customer-side" of the interaction) and used for the benefit of customers.

According to exemplary embodiments, the analytics module 250 may have access to the data stored in the storage device 220, including the customer database and agent database. The analytics module 250 also may have access to the interaction database, which stores data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). Further, the analytic module 250 may be configured to retrieve data stored within the storage device 220 for use in developing and training algorithms and models, for example, by applying machine learning techniques.

One or more of the included models may be configured to predict customer or agent behavior and/or aspects related to contact center operation and performance. Further, one or more of the models may be used in natural language processing and, for example, include intent recognition and the like. The models may be developed based upon known first principle equations describing a system; data, resulting in an empirical model; or a combination of known first principle equations and data. In developing a model for use with present embodiments, because first principles equations are often not available or easily derived, it may be generally preferred to build an empirical model based upon collected and stored data. To properly capture the relationship between the manipulated/disturbance variables and the controlled variables of complex systems, in some embodiments, it may be preferable that the models are nonlinear. This is because nonlinear models can represent curved rather than straight-line relationships between manipulated/disturbance variables and controlled variables, which are common to complex systems such as those discussed herein. Given the foregoing requirements, a machine learning or neural network-based approach may be a preferred embodiment for implementing the models. Neural networks, for example, may be developed based upon empirical data using advanced regression algorithms.

The analytics module 250 may further include an optimizer. As will be appreciated, an optimizer may be used to minimize a "cost function" subject to a set of constraints, where the cost function is a mathematical representation of desired objectives or system operation. Because the models may be non-linear, the optimizer may be a nonlinear programming optimizer. It is contemplated, however, that the technologies described herein may be implemented by using, individually or in combination, a variety of different types of optimization approaches, including, but not limited to, linear programming, quadratic programming, mixed integer non-linear programming, stochastic programming, global non-linear programming, genetic algorithms, particle/swarm techniques, and the like.

According to some embodiments, the models and the optimizer may together be used within an optimization system. For example, the analytics module 250 may utilize the optimization system as part of an optimization process by which aspects of contact center performance and operation are optimized or, at least, enhanced. This, for example, may include features related to the customer experience, agent experience, interaction routing, natural language processing, intent recognition, or other functionality related to automated processes.

The various components, modules, and/or servers of FIG. 2 (as well as the other figures included herein) may each include one or more processors executing computer program instructions and interacting with other system components for performing the various functionalities described herein. Such computer program instructions may be stored in a memory implemented using a standard memory device, such as, for example, a random-access memory (RAM), or stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers in various embodiments. Further, the terms "interaction" and "communication" are used interchangeably, and generally refer to any real-time and non-real-time interaction that uses any communication channel including, without limitation, telephone calls (PSTN or VoIP calls), emails, vmails, video, chat, screen-sharing, text messages, social media messages, WebRTC calls, etc. Access to and control of the components of the contact system 200 may be affected through user interfaces (UIs) which may be generated on the customer devices 205 and/or the agent devices 230. As already noted, the contact center system 200 may operate as a hybrid system in which some or all components are hosted remotely, such as in a cloud-based or cloud computing environment. It should be appreciated that each of the devices of the call center system 200 may be embodied as, include, or form a portion of one or more computing devices similar to the computing device 100 described below in reference to FIG. 1.

Figure 3:
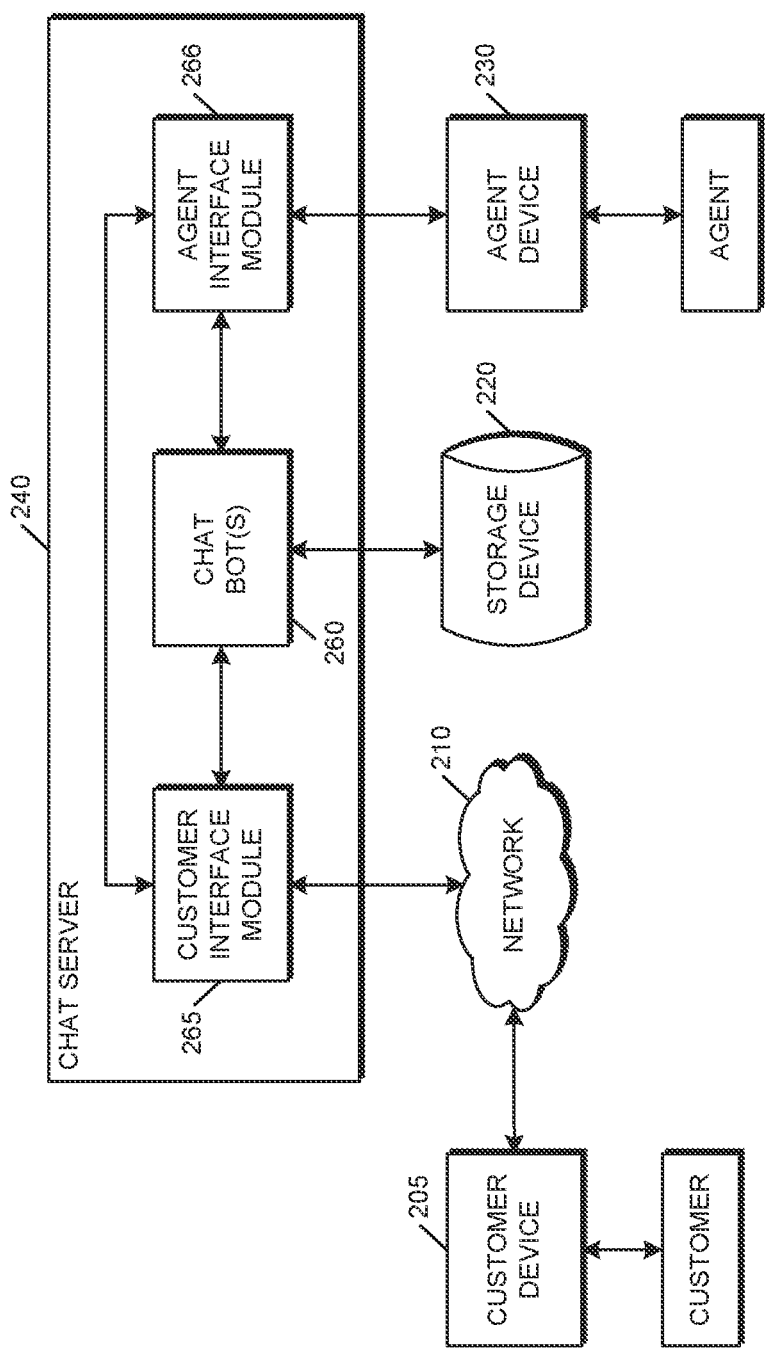
FIG. 3 is a simplified block diagram of at least one embodiment of a chat server of the contact center system of FIG. 2.
Figure 4:
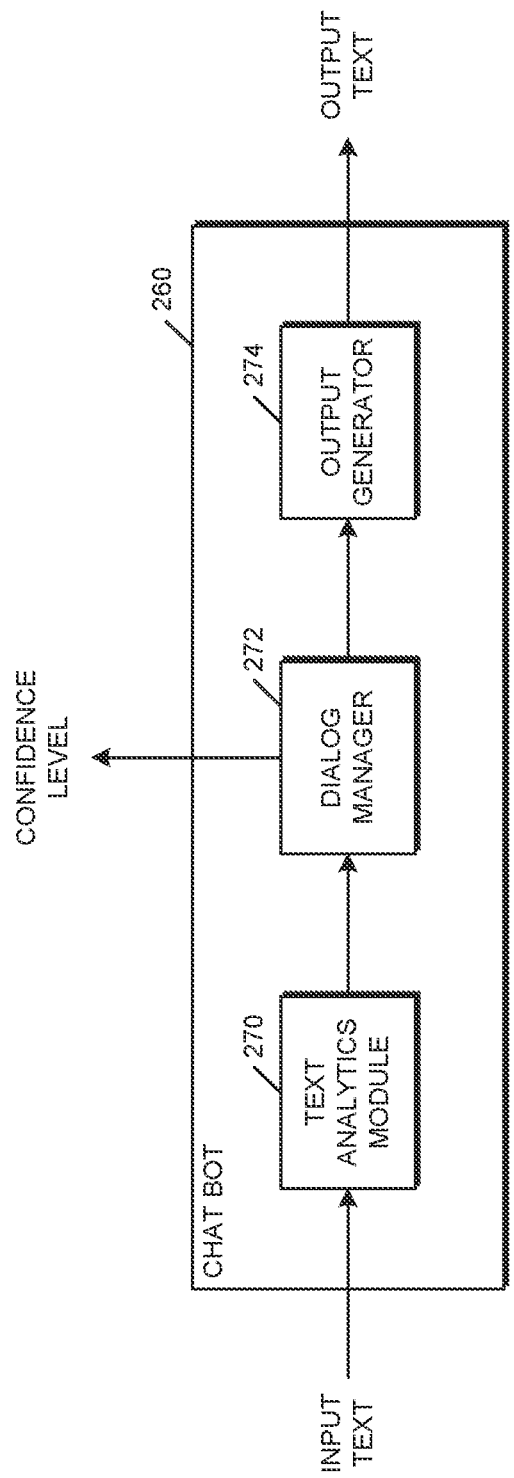
FIG. 4 is a simplified block diagram of at least on embodiment of a chat module.
Figure 5:
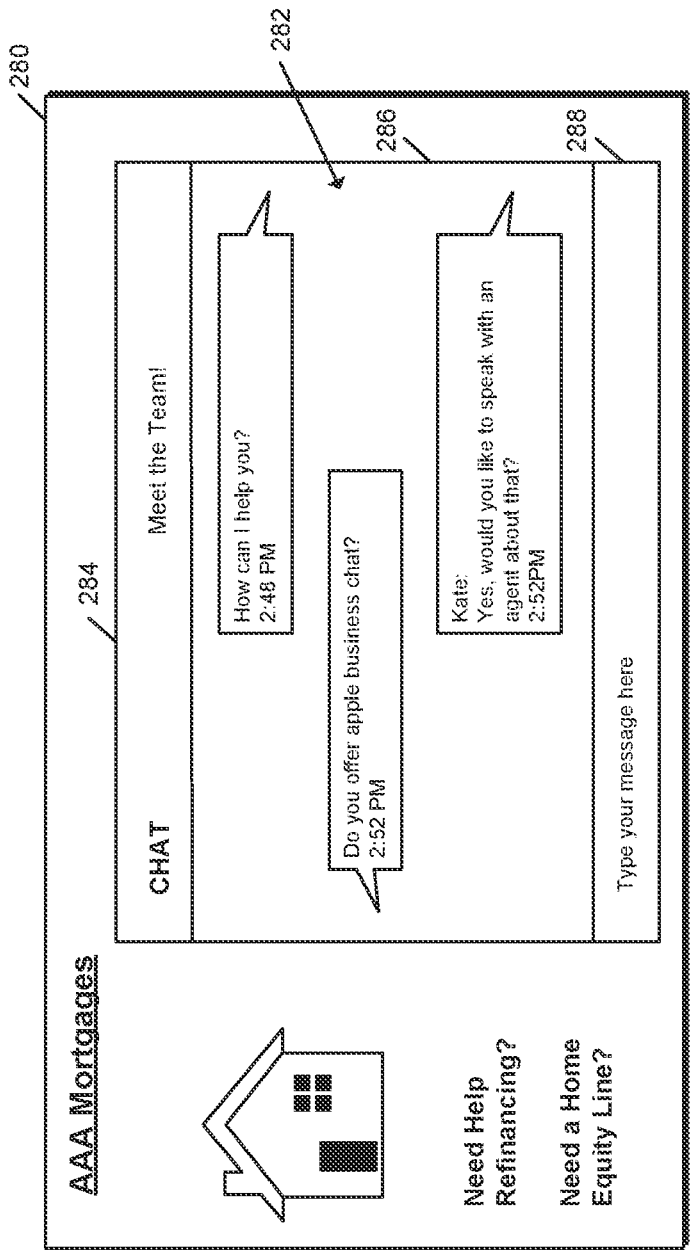
FIG. 5 is a simplified diagram of an example customer chat interface.

Referring now to FIGS. 3, 4 and 5, various aspects of chat systems and chatbots are shown. As will be seen, present embodiments may include or be enabled by such chat features, which, in general, enable the exchange of text messages between different parties. Those parties may include live persons, such as customers and agents, as well as automated processes, such as bots or chatbots.

It should be appreciated that a bot (also known as an "Internet bot") is a software application that runs automated tasks or scripts over the Internet. In many circumstances, bots may perform tasks that are both simple and structurally repetitive at a much higher rate than would be possible for a person. A chatbot is a particular type of bot and, as used herein, is defined as a piece of software and/or hardware that conducts a conversation via auditory or textual methods. As will be appreciated, chatbots are often designed to convincingly simulate how a human would behave as a conversational partner. Chatbots are typically used in dialog systems for various practical purposes including customer service or information acquisition. Some chatbots use sophisticated natural language processing systems, while simpler ones scan for keywords within the input and then select a reply from a database based on matching keywords or wording pattern.

Whether or not the subsequent reference includes the corresponding numerical identifiers used in the figures previously described, it should be understood that the reference incorporates the example described in the previous figures and, unless otherwise specifically limited, may be implemented in accordance with either that examples or other technology capable of fulfilling the desired functionality, as would be understood by one of ordinary skill in the art. Thus, for example, subsequent mention of a "contact center system" should be understood as referring to the exemplary "contact center system 200" of FIG. 2 and/or other technologies for implementing a contact center system. As additional examples, a subsequent mention below to a "customer device", "agent device", "chat server", or "computing device" should be understood as referring to the exemplary "customer device 205", "agent device 230", "chat server 240", or "computing device 200", respectively, of FIGS. 1-2, as well as technology for fulfilling the same functionality.

Chat features and chatbots will now be discussed in greater specificity with reference to the exemplary embodiments of a chat server, chatbot, and chat interface depicted, respectively, in FIGS. 3, 4, and 5. While these examples are provided with respect to chat systems implemented on the contact center-side, such chat systems may be used on the customer-side of an interaction. Thus, it should be understood that the exemplary chat systems of FIGS. 3, 4, and 5 may be modified for analogous customer-side implementation, including the use of customer-side chatbots configured to interact with agents and chatbots of contact centers on a customer's behalf. It should further be understood that chat features may be utilized by voice communications via converting text-to-speech and/or speech-to-text.

Referring specifically now to FIG. 3, a more detailed block diagram is provided of a chat server 240, which may be used to implement chat systems and features. The chat server 240 may be coupled to (i.e., in electronic communication with) a customer device 205 operated by the customer over a data communications network 210. The chat server 240, for example, may be operated by an enterprise as part of a contact center for implementing and orchestrating chat conversations with the customers, including both automated chats and chats with human agents. In regard to automated chats, the chat server 240 may host chat automation modules or chatbots 260A-260C (collectively referenced as 260), which are configured with computer program instructions for engaging in chat conversations. Thus, generally, the chat server 240 implements chat functionality, including the exchange of text-based or chat communications between a customer device 205 and an agent device 230 or a chatbot 260. As discussed more below, the chat server 240 may include a customer interface module 265 and agent interface module 266 for generating particular UIs at the customer device 205 and the agent device 230, respectively, that facilitate chat functionality.

In regard to the chatbots 260, each can operate as an executable program that is launched according to demand. For example, the chat server 240 may operate as an execution engine for the chatbots 260, analogous to loading VoiceXML files to a media server for interactive voice response (IVR) functionality. Loading and unloading may be controlled by the chat server 240, analogous to how a VoiceXML script may be controlled in the context of an interactive voice response. The chat server 240 may further provide a means for capturing and collecting customer data in a unified way, similar to customer data capturing in the context of IVR. Such data can be stored, shared, and utilized in a subsequent conversation, whether with the same chatbot, a different chatbot, an agent chat, or even a different media type. In example embodiments, the chat server 240 is configured to orchestrate the sharing of data among the various chatbots 260 as interactions are transferred or transitioned over from one chatbot to another or from one chatbot to a human agent. The data captured during interaction with a particular chatbot may be transferred along with a request to invoke a second chatbot or human agent.

In exemplary embodiments, the number of chatbots 260 may vary according to the design and function of the chat server 240. Further, different chatbots may be created to have different profiles, which can then be selected between to match the subject matter of a particular chat or a particular customer. For example, the profile of a particular chatbot may include expertise for helping a customer on a particular subject or communication style aimed at a certain customer preference. More specifically, one chatbot may be designed to engage in a first topic of communication (e.g., opening a new account with the business), while another chatbot may be designed to engage in a second topic of communication (e.g., technical support for a product or service provided by the business). Or, chatbots may be configured to utilize different dialects or slang or have different personality traits or characteristics. Engaging chatbots with profiles that are catered to specific types of customers may enable more effective communication and results. The chatbot profiles may be selected based on information known about the other party, such as demographic information, interaction history, or data available on social media. The chat server 240 may host a default chatbot that is invoked if there is insufficient information about the customer to invoke a more specialized chatbot. Optionally, the different chatbots may be customer selectable. In exemplary embodiments, profiles of chatbots 260 may be stored in a profile database hosted in the storage device 220. Such profiles may include the chatbot's personality, demographics, areas of expertise, and the like.

The customer interface module 265 and agent interface module 266 may be configured to generate user interfaces (UIs) for display on the customer device 205 that facilitate chat communications between the customer and a chatbot 260 or human agent. Likewise, an agent interface module 266 may generate particular UIs on the agent device 230 that facilitate chat communications between an agent operating an agent device 230 and the customer. The agent interface module 266 may also generate UIs on an agent device 230 that allow an agent to monitor aspects of an ongoing chat between a chatbot 260 and a customer. For example, the customer interface module 265 may transmit signals to the customer device 205 during a chat session that are configured to generated particular UIs on the customer device 205, which may include the display of the text messages being sent from the chatbot 260 or human agent as well as other non-text graphics that are intended to accompany the text messages, such as emoticons or animations. Similarly, the agent interface module 266 may transmit signals to the agent device 230 during a chat session that are configured to generated UIs on the agent device 230. Such UIs may include an interface that facilitates the agent selection of non-text graphics for accompanying outgoing text messages to customers.

In exemplary embodiments, the chat server 240 may be implemented in a layered architecture, with a media layer, a media control layer, and the chatbots executed by way of the IMR server 216 (similar to executing a VoiceXML on an IVR media server). As described above, the chat server 240 may be configured to interact with the knowledge management server 234 to query the server for knowledge information. The query, for example, may be based on a question received from the customer during a chat. Responses received from the knowledge management server 234 may then be provided to the customer as part of a chat response.

Referring specifically now to FIG. 4, a block diagram is provided of an exemplary chat automation module or chatbot 260. As illustrated, the chatbot 260 may include several modules, including a text analytics module 270, dialog manager 272, and output generator 274. It will be appreciated that, in a more detailed discussion of chatbot operability, other subsystems or modules may be described, including, for examples, modules related to intent recognition, text-to-speech or speech-to-text modules, as well as modules related to script storage, retrieval, and data field processing in accordance with information stored in agent or customer profiles. Such topics, however, are covered more completely in other areas of this disclosure—for example, in relation to FIGS. 6 and 7—and so will not be repeated here for brevity of the description. It should nevertheless be understood that the disclosures made in these areas may be used in analogous ways toward chatbot operability in accordance with functionality described herein.

The text analytics module 270 may be configured to analyze and understand natural language. In this regard, the text analytics module may be configured with a lexicon of the language, syntactic/semantic parser, and grammar rules for breaking a phrase provided by the customer device 205 into an internal syntactic and semantic representation. The configuration of the text analytics module depends on the particular profile associated with the chatbot. For example, certain words may be included in the lexicon for one chatbot but excluded that of another.

The dialog manager 272 receives the syntactic and semantic representation from the text analytics module 270 and manages the general flow of the conversation based on a set of decision rules. In this regard, the dialog manager 272 maintains a history and state of the conversation and, based on those, generates an outbound communication. The communication may follow the script of a particular conversation path selected by the dialog manager 272. As described in further detail below, the conversation path may be selected based on an understanding of a particular purpose or topic of the conversation. The script for the conversation path may be generated using any of various languages and frameworks conventional in the art, such as, for example, artificial intelligence markup language (AIML), SCXML, or the like.

During the chat conversation, the dialog manager 272 selects a response deemed to be appropriate at the particular point of the conversation flow/script and outputs the response to the output generator 274. In exemplary embodiments, the dialog manager 272 may also be configured to compute a confidence level for the selected response and provide the confidence level to the agent device 230. Every segment, step, or input in a chat communication may have a corresponding list of possible responses. Responses may be categorized based on topics (determined using a suitable text analytics and topic detection scheme) and suggested next actions are assigned. Actions may include, for example, responses with answers, additional questions, transfer to a human agent to assist, and the like. The confidence level may be utilized to assist the system with deciding whether the detection, analysis, and response to the customer input is appropriate or whether a human agent should be involved. For example, a threshold confidence level may be assigned to invoke human agent intervention based on one or more business rules. In exemplary embodiments, confidence level may be determined based on customer feedback. As described, the response selected by the dialog manager 272 may include information provided by the knowledge management server 234.

In exemplary embodiments, the output generator 274 takes the semantic representation of the response provided by the dialog manager 272, maps the response to a chatbot profile or personality (e.g., by adjusting the language of the response according to the dialect, vocabulary, or personality of the chatbot), and outputs an output text to be displayed at the customer device 205. The output text may be intentionally presented such that the customer interacting with a chatbot is unaware that it is interacting with an automated process as opposed to a human agent. As will be seen, in accordance with other embodiments, the output text may be linked with visual representations, such as emoticons or animations, integrated into the customer's user interface.

Referring now to FIG. 5, a webpage 280 having an exemplary implementation of a chat feature 282 is shown. The webpage 280, for example, may be associated with an enterprise website and intended to initiate interaction between prospective or current customers visiting the webpage and a contact center associated with the enterprise. As will be appreciated, the chat feature 282 may be generated on any type of customer device 205, including personal computing devices such as laptops, tablet devices, or smart phones. Further, the chat feature 282 may be generated as a window within a webpage or implemented as a full-screen interface. As in the example shown, the chat feature 282 may be contained within a defined portion of the webpage 280 and, for example, may be implemented as a widget via the systems and components described above and/or any other conventional means. In general, the chat feature 282 may include an exemplary way for customers to enter text messages for delivery to a contact center.

As an example, the webpage 280 may be accessed by a customer via a customer device, such as the customer device, which provides a communication channel for chatting with chatbots or live agents. In exemplary embodiments, as shown, the chat feature 282 includes generating a user interface, which is referred to herein as a customer chat interface 284, on a display of the customer device. The customer chat interface 284, for example, may be generated by the customer interface module of a chat server, such as the chat server, as already described. As described, the customer interface module 265 may send signals to the customer device 205 that are configured to generate the desired customer chat interface 284, for example, in accordance with the content of a chat message issued by a chat source, which, in the example, is a chatbot or agent named "Kate". The customer chat interface 284 may be contained within a designated area or window, with that window covering a designated portion of the webpage 280. The customer chat interface 284 also may include a text display area 286, which is the area dedicated to the chronological display of received and sent text messages. The customer chat interface 284 further includes a text input area 288, which is the designated area in which the customer inputs the text of their next message. It should be appreciated that other configurations may be used in other embodiments.

It should be appreciated that various systems and methods may be used for automating and augmenting customer actions during various stages of interaction with a customer service provider or contact center. Those various stages of interaction may be classified as pre-contact, during-contact, and post-contact stages (or, respectively, pre-interaction, during-interaction, and post-interaction stages). With specific reference now to FIG. 6, an exemplary customer automation system 300 is shown that may be used in conjunction with the various technologies described herein. To better explain how the customer automation system 300 functions, reference will also be made to FIG. 7, which provides a flowchart 350 of an exemplary method for automating customer actions when, for example, the customer interacts with a contact center. Additional information related to customer automation are provided in U.S. patent application Ser. No. 16/151,362, filed on Oct. 4, 2018, entitled "System and Method for Customer Experience Automation," the contents of which are incorporated herein by reference.

Figure 6:
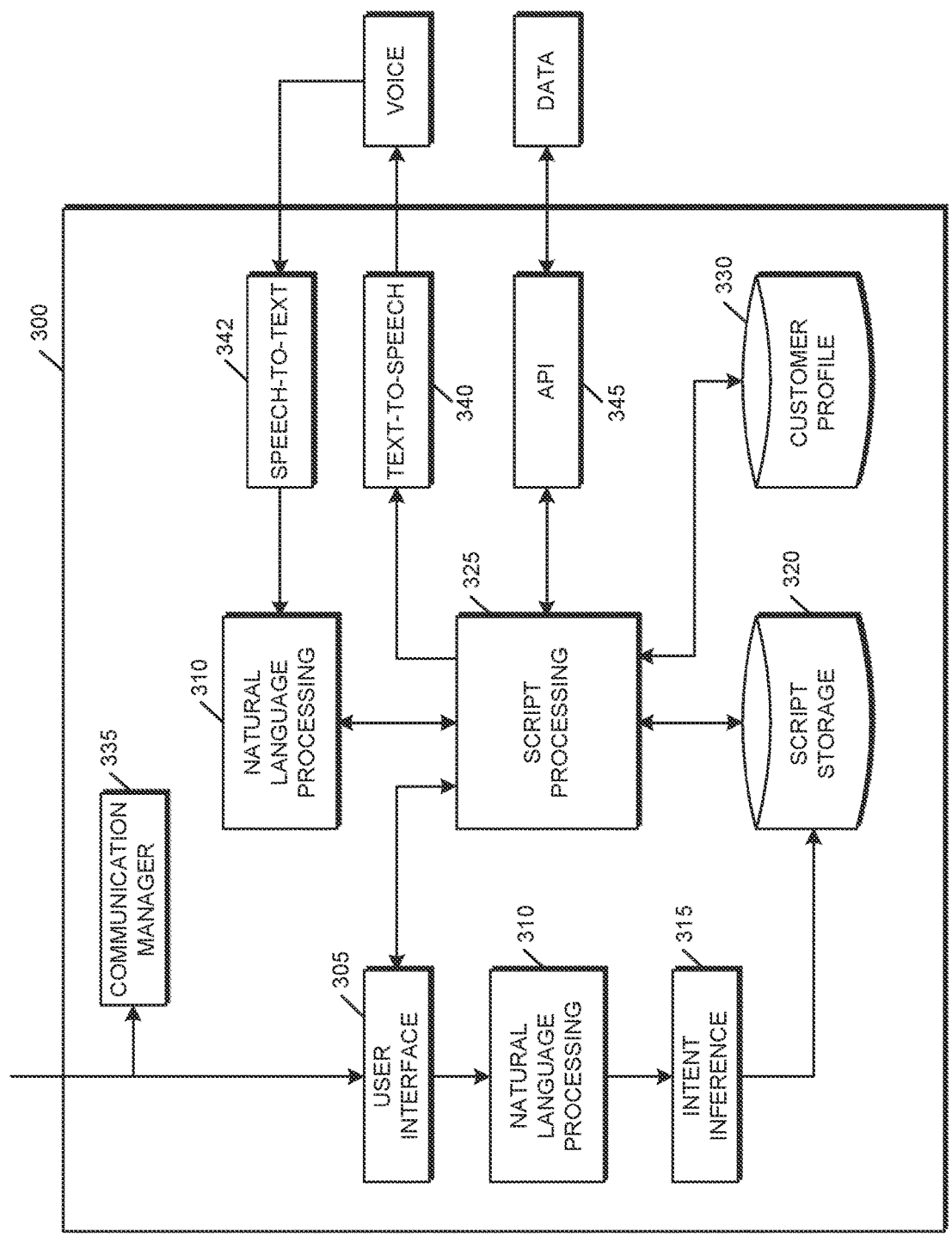
FIG. 6 is a simplified block diagram of at least one embodiment of a customer automation system.

The customer automation system 300 of FIG. 6 represents a system that may be used for customer-side automations, which, as used herein, refers to the automation of actions taken on behalf of a customer in interactions with customer service providers or contact centers. Such interactions may also be referred to as "customer-contact center interactions" or simply "customer interactions". Further, in discussing such customer-contact center interactions, it should be appreciated that reference to a "contact center" or "customer service provider" is intended to generally refer to any customer service department or other service provider associated with an organization or enterprise (such as, for example, a business, governmental agency, non-profit, school, etc.) with which a user or customer has business, transactions, affairs or other interests.

In exemplary embodiments, the customer automation system 300 may be implemented as a software program or application running on a mobile device or other computing device, cloud computing devices (e.g., computer servers connected to the customer device 205 over a network), or combinations thereof (e.g., some modules of the system are implemented in the local application while other modules are implemented in the cloud. For the sake of convenience, embodiments are primarily described in the context of implementation via an application running on the customer device 205. However, it should be understood that present embodiments are not limited thereto.

The customer automation system 300 may include several components or modules. In the illustrated example of FIG. 6, the customer automation system 300 includes a user interface 305, natural language processing (NLP) module 310, intent inference module 315, script storage module 320, script processing module 325, customer profile database or module (or simply "customer profile") 330, communication manager module 335, text-to-speech module 340, speech-to-text module 342, and application programming interface (API) 345, each of which will be described with more particularity with reference also to flowchart 350 of FIG. 7. It will be appreciated that some of the components of and functionalities associated with the customer automations system 300 may overlap with the chatbot systems described above in relation to FIGS. 3, 4, and 5. In cases where the customer automation system 300 and such chatbot systems are employed together as part of a customer-side implementation, such overlap may include the sharing of resources between the two systems.

Figure 7:
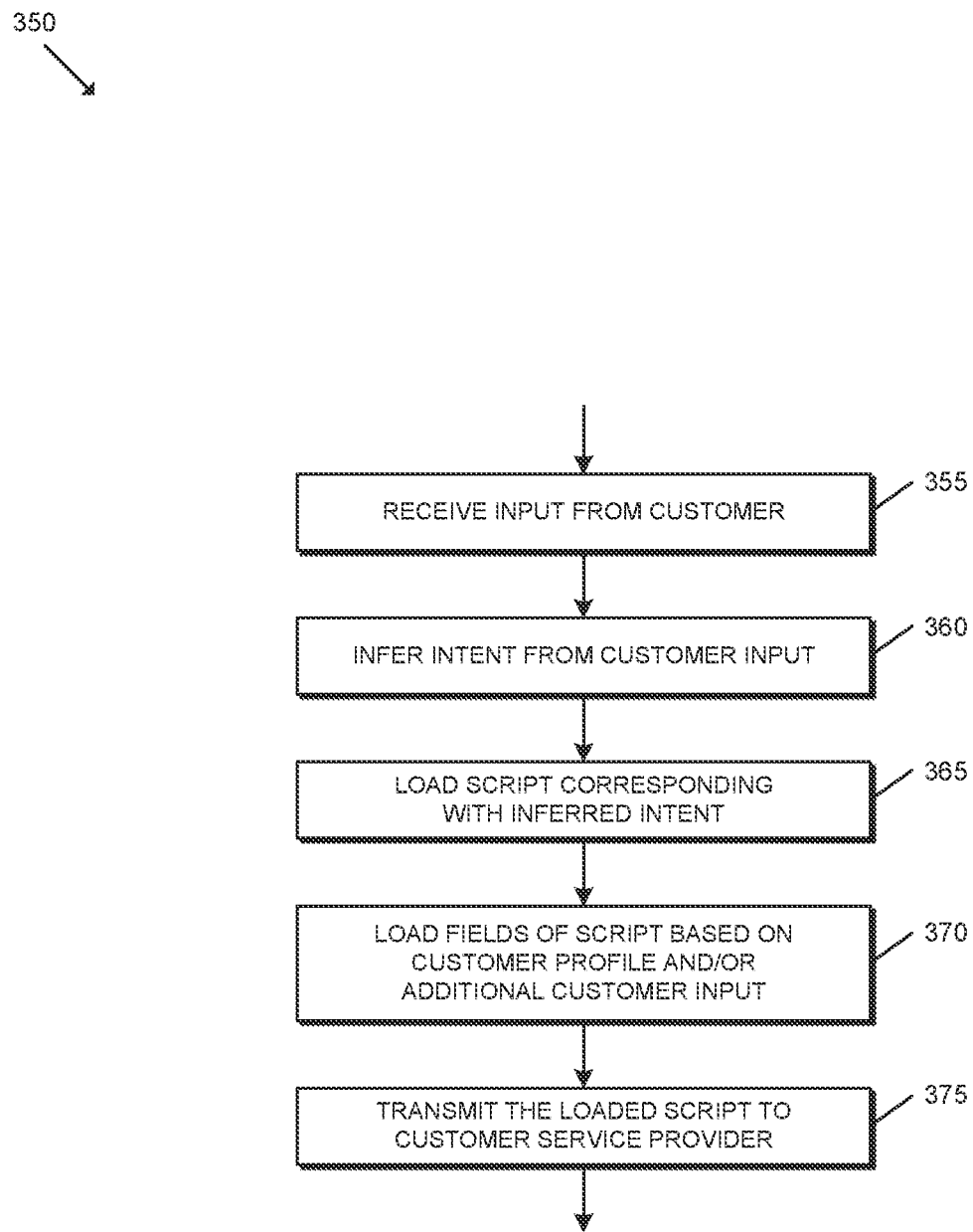
FIG. 7 is a simplified flow diagram of at least one embodiment of a method of automating an interaction on behalf of a customer.

In an example of operation, with specific reference now to the flowchart 350 of FIG. 7, the customer automation system 300 may receive input at an initial step or operation 355. Such input may come from several sources. For example, a primary source of input may be the customer, where such input is received via the customer device. The input also may include data received from other parties, particularly parties interacting with the customer through the customer device. For example, information or communications sent to the customer from the contact center may provide aspects of the input. In either case, the input may be provided in the form of free speech or text (e.g., unstructured, natural language input). Input also may include other forms of data received or stored on the customer device.

Continuing with the flowchart 350, at an operation 360, the customer automation system 300 parses the natural language of the input using the NLP module 310 and, therefrom, infers an intent using the intent inference module 315. For example, where the input is provided as speech from the customer, the speech may be transcribed into text by a speech-to-text system (such as a large vocabulary continuous speech recognition or LVCSR system) as part of the parsing by the NLP module 310. The transcription may be performed locally on the customer device 205 or the speech may be transmitted over a network for conversion to text by a cloud-based server. In certain embodiments, for example, the intent inference module 315 may automatically infer the customer's intent from the text of the provided input using artificial intelligence or machine learning techniques. Such artificial intelligence techniques may include, for example, identifying one or more keywords from the customer input and searching a database of potential intents corresponding to the given keywords. The database of potential intents and the keywords corresponding to the intents may be automatically mined from a collection of historical interaction recordings. In cases where the customer automation system 300 fails to understand the intent from the input, a selection of several intents may be provided to the customer in the user interface 305. The customer may then clarify their intent by selecting one of the alternatives or may request that other alternatives be provided.

After the customer's intent is determined, the flowchart 350 proceeds to an operation 365 where the customer automation system 300 loads a script associated with the given intent. Such scripts, for example, may be stored and retrieved from the script storage module 320. Such scripts may include a set of commands or operations, pre-written speech or text, and/or fields of parameters or data (also "data fields"), which represent data that is required to automate an action for the customer. For example, the script may include commands, text, and data fields that will be needed in order to resolve the issue specified by the customer's intent. Scripts may be specific to a particular contact center and tailored to resolve particular issues. Scripts may be organized in a number of ways, for example, in a hierarchical fashion, such as where all scripts pertaining to a particular organization are derived from a common "parent" script that defines common features. The scripts may be produced via mining data, actions, and dialogue from previous customer interactions. Specifically, the sequences of statements made during a request for resolution of a particular issue may be automatically mined from a collection of historical interactions between customers and customer service providers. Systems and methods may be employed for automatically mining effective sequences of statements and comments, as described from the contact center agent side, are described in U.S. patent application Ser. No. 14/153,049, filed on Jan. 12, 2014, entitled "Computing Suggested Actions in Caller Agent Phone Calls By Using Real-Time Speech Analytics and Real-Time Desktop Analytics," the contents of which are incorporated by reference herein.

With the script retrieved, the flowchart 350 proceeds to an operation 370 where the customer automation system 300 processes or "loads" the script. This action may be performed by the script processing module 325, which performs it by filling in the data fields of the script with appropriate data pertaining to the customer. More specifically, the script processing module 325 may extract customer data that is relevant to the anticipated interaction, with that relevance being predetermined by the script selected as corresponding to the customer's intent. The data for many of the data fields within the script may be automatically loaded with data retrieved from data stored within the customer profile 330. As will be appreciated, the customer profile 330 may store particular data related to the customer, for example, the customer's name, birth date, address, account numbers, authentication information, and other types of information relevant to customer service interactions. The data selected for storage within the customer profile 330 may be based on data the customer has used in previous interactions and/or include data values obtained directly by the customer. In case of any ambiguity regarding the data fields or missing information within a script, the script processing module 325 may include functionality that prompts and allows the customer to manually input the needed information.

Referring again to the flowchart 350, at an operation 375, the loaded script may be transmitted to the customer service provider or contact center. As discussed more below, the loaded script may include commands and customer data necessary to automate at least a part of an interaction with the contact center on the customer's behalf. In exemplary embodiments, an API 345 is used so to interact with the contact center directly. Contact centers may define a protocol for making commonplace requests to their systems, which the API 345 is configured to do. Such APIs may be implemented over a variety of standard protocols such as Simple Object Access Protocol (SOAP) using Extensible Markup Language (XML), a Representational State Transfer (REST) API with messages formatted using XML or JavaScript Object Notation (JSON), and the like. Accordingly, the customer automation system 300 may automatically generate a formatted message in accordance with a defined protocol for communication with a contact center, where the message contains the information specified by the script in appropriate portions of the formatted message The technologies described herein involve various systems and methods for predictive routing and occupancy balancing in contact center systems and/or other contexts or environments. It should be appreciated that predictive routing leverages historical data to build models that score agents according to their suitability for optimizing a given key performance indicator (KPI) in a given interaction. For example, if the call/contact center administrator wants to optimize for average hold time (AHT), predictive routing may assign a high score for those agents who are likely to produce a low final handle time. In some embodiments, a high score is always assigned to the best (available) agent regardless of whether it is a minimization or maximization problem—scores are computed out of the model predictions. By default, predictive routing may try to optimize a target KPI while disregarding factors such as agents not getting calls because they are not found suitable for various interactions. This may be referred to as "agent starvation" and may contribute to an "unfair utilization" of some agents. Additionally, predictive routing assignments could be "unfair" if some agents are overloaded with interactions because they are considered good at something—this could yield, for example, to a drop in performance among typically strong agents. Unfair utilization may have several complications. For example, in a sales scenario, agents not receiving calls generally will not be able to make up their sales goals and miss rewards, or agents could feel exploited. Accordingly, there is a need to study means for introducing fairness controls to predictive routing, which can be leveraged by call center administrators when needed to ensure a fair level of utilization across all agents.

To describe the problem mathematically, let $R(x)=(a_1, a_2, \ldots, a_n)$ be a list of n agents sorted according to their ranks, which is based on the predictive routing prediction for an interaction (x), denoted by $f(x, a_i)$. For a given interaction, x, the rank function $\text{rank}(x, a_i)$ maps the outputs of the predictor $f(x, a_i)$ for any agent $a_i$ to $\{0, 1, \ldots, n\}$ such that if $f(x, a_i) > f(x, a_k)$ for maximization, and $f(x, a_i) < f(x, a_k)$ for minimization, respectively, then $\text{rank}(x, a_i) < \text{rank}(x, a_k)$. The lower the rank, the higher the chances for an agent to be assigned an interaction during routing.

For any particular agent $a_i$, the $\text{rank}(x, a_i)$ may repeatedly be higher than the rank values of other agents (e.g., in lower quartiles), which may indicate that the particular agent is considered less suitable to take interactions. However, this can translate into agents not getting calls (e.g., being under-utilized and entering into "starvation"), agents getting the majority of calls (e.g., being over utilized), a drop in agent performance, non-homogeneous occupancy across agents, and/or agents not achieving their sales targets to unlock rewards. Such outcomes may be considered an unfair utilization of agents and raised as an issue or concern by contact centers utilizing such predictive routing. To the extent that such issues can be addressed, it will also provide a path towards applying artificial intelligence (AI) and/or machine learning (ML) fairly and contribute to the acceptance of providing predictive routing as a service.

It should be appreciated that the technologies described herein provide various solutions to the above-stated problems. However, in adequately understanding the effectiveness of such solutions, several significant questions may be posed. For example, a first question involves how to measure occupancy for an agent across all media types. A second question includes how balanced utilization/occupancy for each of the agents can be ensured. This may include the consideration of minimum and maximum boundaries. Also, are there ways of solving this issue which have greater or lesser impacts on the benefits associated with predictive routing? Another question involves how to ensure a minimum level of a performance metric (besides occupancy) for the agents. For example, can all salespeople be afforded the same number of high-value opportunities? Another question relates to how to determine whether a given agent requires specific training to improve his performance on a selected metric. And another question relates to how to measure the impact to overall sales targets as the re-ranking of agents will affect the benefit estimation initially made by predictive routing.

It should be further appreciated that the term "prediction" may be used herein to describe the raw value returned by the predictive routing predictor/model, the term "score" may be used herein to describe the normalized prediction between 0 and 100 (or another normalized ranged) which is given to an assignment, the term "rank" may be used herein to describe the position of the agent in a result list based on its (normalized) score (e.g., with 1 being the best and N the worst), and/or the term "occupancy" may be used herein to describe the metric measuring the percentage of the total logged time an agent has spent in interactions. More specifically, "agent occupancy" may represent the total time that an agent actually spends handling interactions. A "predicted calculation" of agency occupancy may be calculated as the total time the agent is predicted to be in interacting routing status divided by the total scheduled on-queue time in a particular interval. An "actual calculation" of agency occupancy may be calculated as the total time in interacting routing status divided by the total actual on-queue time (e.g., sum of interacting time, communicating time, and idle routing status time) in a particular interval.

Contact centers struggle with the problem of agent workload balancing, and a main concern is preventing "burn out" among the best agents, which can occur through predictive routing technologies without the introduction of control mechanisms. The technologies described herein introduce mechanisms that provide value from predictive routing to be realized while simultaneously being balanced with the operational priorities of the contact center.

By leveraging predictive routing, a contact center administrator can control how interactions are distributed between agents and thereby achieve the optimum balance between outcome performance and other business objectives. As described above, predictive routing may push calls towards those agents most likely to achieve a positive KPI outcome, which can create an imbalanced distribution of calls when compared to the standard approach of contact centers (e.g., targeting the longest waiting suitable agent). Some agents (e.g., high performers) may receive more calls than other agents and/or more calls than they would have received without predictive routing, resulting in significant occupancy differences between agents. This can be problematic for several reasons. For example, agents with high occupancy can suffer from burnout or be unhappy that they are working harder than their colleagues. Also, agents with low occupancy may not be getting opportunities to learn, receive coaching, and generally improve performance. Such agents represent underutilized capacity in the contact center and may object to a lack of opportunity to earn commission-based incentives.

In order to address the issues above, a mechanism may be employed that allows contact centers to override the recommendations of predictive routing. For example, when agent occupancy falls outsides their acceptable limits (e.g., outside the 75%-85% range), one or more actions may be taken to override the recommendations of predictive routing and increase occupancy for some of the agents. As another example, a control mechanism may be provided that allows contact center administrators to set upper and lower occupancy thresholds. Where agent occupancy is below the lower threshold, the agent's score for an incoming interaction may be multiplied by a coefficient that boosts the agent's ranking and increases the likelihood that the incoming interactions will be routed to that agent. Where the agent's occupancy exceeds the upper threshold, a different coefficient may be used so that the agent's ranking is decreased so that the likelihood that the incoming interactions will be routed to that agent is reduced. The agents falling outside the thresholds may thereby be prioritized or de-prioritized relative to their original rankings for the interaction.

It should be appreciated that deviating the attention from optimizing a single or target KPI to also account for occupancy may negatively impact the extent to which the main KPI can be optimized. In other words, factoring occupancy has potential side effects for predictive routing in that the multiple objectives (e.g., maximizing KPI and balancing occupancy) may be competing interests. At one extreme, the system may focus on optimizing only the KPI in which case occupancy may be a secondary consideration. At another extreme, the system may focus on optimizing only the occupancy in which case the target KPI may be a secondary consideration. The technologies described herein may operate within those extremes in that the system balances the optimization of the target KPI with occupancy (e.g., optimizing a target KPI while maintaining at least a minimum occupancy across all agents). In such embodiments, imbalanced occupancy is avoided while favorable results in the target KPI are also achieved. Further, the technologies described herein permit such optimization to occur with little or no input from contact center administrators.

Figure 8:
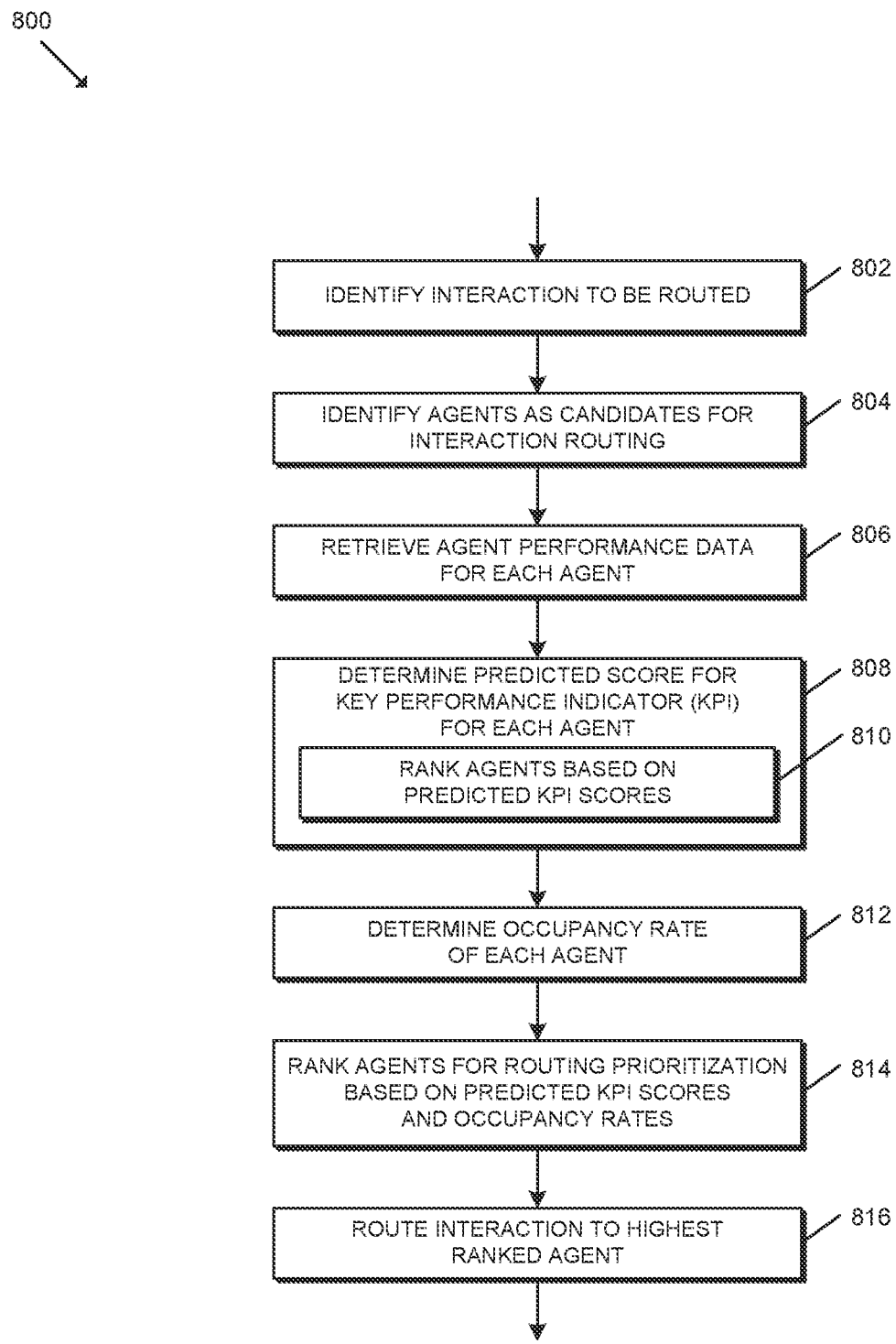
FIG. 8 is a simplified flow diagram of at least one embodiment of a method of routing interactions to contact center agents.

Referring now to FIG. 8, in use, a computing system (e.g., the computing device 100, the contact center system 200, and/or other computing devices described herein) may execute a method 800 for routing interactions to contact center agents. It should be appreciated that the particular blocks of the method 800 are illustrated by way of example, and such blocks may be combined or divided, added or removed, and/or reordered in whole or in part depending on the particular embodiment, unless stated to the contrary.

The illustrative method 800 begins with block 802 in which the system identifies an interaction (e.g., with an end user of a contact center system) to be routed to an agent (e.g., a contact center agent). In block 804, the system identifies a group of agents as candidates for routing of the interaction. For example, in some embodiments, the group of candidate agents may be all agents currently available to respond to the interaction, whereas in other embodiments, the group of candidate agents may be a subset of agents currently available to respond to the interaction. In yet another embodiment, the group of candidate agents may be otherwise determined or identified.

In block 806, the system retrieves agent performance data for each candidate agent of the group of contact center agents identified as candidates for routing of the interaction. The agent performance data for each candidate agent may include, for example, the occupancy rate, idle time, status, historical data, and/or other data associated with the performance of the corresponding candidate agent. It should be further associated that the agent performance data may include one or more agent predictions and/or agent scores associated with one or more key performance indicators (KPI) for the corresponding candidate agent (e.g., raw values, normalized predictions, intermediate values, and/or other relevant performance data).

In block 808, the system determines a predicted score for a particular key performance indicator (KPI) for each candidate agent based on the agent performance data. As described above, it should be appreciated that the particular KPI of relevance may vary depending on the particular embodiment. For example, in some embodiments, the KPI being optimized may be the average handle time (AHT) of the agent. In other embodiments, the KPI being optimized may be, for example, customer satisfaction (CSAT), next contact avoidance (NCA), number of transfers, net promoter score (NPS), case resolution time (CRT), sales conversion, sales revenue, average wait time (AWT), first call resolution (FCR), and/or another KPI. It should be further appreciated that, in some embodiments, the agent performance data may itself include the relevant predicted scores for the KPI, whereas in other embodiments, the system may calculate the predicted scores based on raw, normalized, and/or intermediate data included with the agent performance data. In some embodiments, in block 810, the system may also rank (e.g., initially) the candidate agents based on the predicted KPI scores. For example, the candidate agents may be ranked such that the candidate agent with the best predicted KPI score has the best rank (e.g., ranked first), and the candidate agent with the worst predicted KPI has the worst rank (e.g., ranked last). It should be appreciated that the predicted KPI scores may be normalized such that the system can use the same ranking system irrespective of whether optimization of the KPI scores involves maximization/minimization of the KPI, irrespective of the possible values of the data underlying the KPI, and irrespective of other factors unique to a particular KPI.

In block 812, the system determines the occupancy rate of each candidate agent based on the agent performance data. As with the predicted scores, in some embodiments, the agent performance data itself may include the occupancy rate, whereas in other embodiments, the system may calculate the occupancy rate based on raw, normalized, and/or intermediate data included with the agent performance data. Further, although the method 800 is described herein with respect to the use of the occupancy rate, it should be appreciated that the system may utilize other data that serves as a proxy for the occupancy rate in some embodiments. For example, in some embodiments, the system may leverage the techniques described herein utilizing agent idle time as a proxy for the agent occupancy rate.

In block 814, the system generates a ranking of the candidate agents for routing prioritization based on the predicted KPI scores and the occupancy rates of each candidate agent. In particular, the system may generate a modified predicted score for each candidate agent based on the predicted KPI score and the occupancy score for the corresponding agent, and rank the candidate agents for routing prioritization based on the modified predicted score for each candidate. It should be appreciated that the system may utilize various different approaches and/or algorithms for generating the ranking of candidate agents depending on the particular embodiment, some of which are described in greater detail below.

In block 816, the system may select a candidate agent to which to route the interact based on the ranking of the candidate agents and signal a routing device to route the interaction to the selected candidate agent and/or otherwise cause the routing of the interaction to the selected candidate agent. In some embodiments, the system may route the interaction to the best ranked candidate agent (e.g., first ranked agent).

Although the blocks 802-816 are described in a relatively serial manner, it should be appreciated that various blocks of the method 800 may be performed in parallel in some embodiments.

As indicated above, the system may utilize various different approaches or algorithms for generating the ranking of candidate agents depending on the particular embodiment.

According to a first approach, the system may implement the occupancy balancing by applying multipliers to the predicted agents scores for agents have high or low occupancy according to predetermined occupancy thresholds. That is, the system may generate the modified predicted score for a candidate agent by increasing the predicted score for the corresponding candidate agent if the occupancy rate of that candidate agent is less than a predefined occupancy threshold, and by decreasing the predicted score for the corresponding candidate agent if the occupancy rate of that candidate agent is greater than another predefined occupancy threshold.

To describe the first approach mathematically, let UO be the upper occupancy rate and LO be the lower occupancy rate, each of which may be configured by a contact center administrator in the illustrative embodiment. The occupancy balancing goal may then be to maintain the occupancy over a period of time (e.g., 1 hour, 4 hours, 8 hours, etc.), which may also be an administrative input, within LO and UO as much as possible. It should be appreciated that in certain circumstances, these thresholds may not be able to be satisfied (e.g., edge cases).

For a given scoring request considering N agents, we may retrieve, obtain, or determine predictive routing predictions as $a=[a_1, a_2, a_N]$ and corresponding agent occupancy at time, t, as $o^t=o_1^t, o_2^t, \ldots, o_N^t$. The system calculates the occupancy of the top agent and the bottom agent. In particular, the occupancy of the top agent may be calculated according to $o_{top}=o^t[\arg\max(a)]$, and if $o_{top}>UO$, then the system may multiply $o_{top}$ by a real number, $\alpha$, greater than zero and less than one ($0<\alpha<1$) to decrease the prediction score and, therefore, worsen the rank of the agent. The occupancy of the bottom agent may be calculated according to $o_{bottom}=o^t[\arg\min(a)]$, and if $o_{bottom}>LO$, then the system may multiply $o_{bottom}$ by a real number, $\beta$, greater than one ($\beta>1$) to increase the prediction score and, therefore, improve the rank of the agent. It should be appreciated that arg max( ) and arg min( ) return the index of the maximum and minimum value in a vector, respectively. As described above, some KPIs are optimized through maximization, whereas other KPIs are optimized through minimization; however, in the illustrative embodiment, the normalization of the predicted scores ensures that the same ranking algorithm may be used for both types of KPIs.

It should be appreciated that, using the first approach, only the scores and ranks of the top and bottom agents were affected, and the agents in the "middle" were generally left unchanged (e.g., depending on the configured threshold values). As such, a second approach aims to account for occupancy across a greater number of the agents (e.g., all agents). According to the second approach, the system may determine an availability rate of the corresponding candidate agent (one minus the occupancy rate) and generate the modified predicted score for a candidate agent by dividing the predicted score for the candidate agent by the availability rate of that candidate agent.

To describe the second approach mathematically, let $a=[a_1, a_2, \ldots, a_N]$ be the vector of predictions generated by predictive routing for a given scoring request, where $a_i$ is the raw prediction for the $i^{th}$ agent and there are N agents. Further, let a' be a permutation of a that is sorted according to the predictions in descending order for maximization and ascending order for minimization, respectively. Additionally, an occupancy vector is defined according to $o^t=o_1^t, o_2^t, \ldots, o_N^t$, which represents the occupancy for each agent at a given timestamp, t. In the illustrative embodiment, the average occupancy is always between 0.0 (0%) and 1.0 (100%). The updated prediction is calculated according to updated_prediction=pred/(1−occupancy). It should be appreciated that the lower the occupancy, the smaller the growth of the updated prediction for an agent, meaning that agents with lower occupancy should see their rank decreased (i.e., improved). In the illustrative embodiment, the second approach assumes that occupancy will never reach 1.0 (i.e., 100% occupancy). However, in an effort to address such a circumstance, the algorithm of the second approach may be modified to add a very small value to the denominator (e.g., $\varepsilon=0.0001$).

It should be appreciated that the second approach may have "side effects" in that there is less control over the "range of occupancy" that users want agents to fall within, and the KPI optimization may be hindered as described above (e.g., from often de-prioritizing higher ranked agents, even when falling within an otherwise acceptable occupancy range). Table 1 depicted below shows the prediction scores for three agents, occupancy scores, updated prediction scores, and updated ranks. As indicated above, the updated score is calculated according to updated_prediction=pred/(1−occupancy).

TABLE 1

Second Approach

|  | Prediction Score | Occupancy | Updated Score | Rank |
|---|---|---|---|---|
| Agent #1 | 100 | 0.8 | 500.00 | 2 |
| Agent #2 | 200 | 0.7 | 666.67 | 3 |
| Agent #3 | 300 | 0.3 | 428.57 | 1 |

Although the first and second approaches allow for a focus on occupancy, a third approach may also allow the contact center administrator to weigh occupancy by changing a parameter or weighting factor depending on the particular needs of the administrator or system. For example, in some embodiments, the system may display a user interface option (e.g., a graphical slider) that allows the administrator to select how much emphasis/weight to be placed on occupancy (e.g., a value between 0.0 and 1.0), and the system may calculate an updated prediction value based on how much importance is given to occupancy. The occupancy relevance factor (i.e., weighting factor) may be defined as a, and the updated score may be calculated according to updated_prediction=pred/(1−occupancy*α). The third approach allows for three categories of emphasis. If α=0.0, occupancy is fully disregarded and the system only focuses on the KPI. If α=1.0, occupancy is fully factored, and the approach becomes equivalent to the second approach. If 0.0<α<1.0, then the system uses a weighted occupancy to balance KPI and occupancy optimizations to some degree.

Table 2 depicted below shows the predictions for three agents, occupancy scores, updated prediction scores, and updated ranks when α=0.70. It will be appreciated that the occupancy is considered and Agent #3, who has the lowest occupancy, becomes the second option to take the interaction.

TABLE 2

Third Approach (α = 0.70)

|  | Prediction Score | Occupancy | Updated Score | Rank |
|---|---|---|---|---|
| Agent #1 | 100 | 0.8 | 227.27 | 1 |
| Agent #2 | 200 | 0.7 | 392.16 | 3 |
| Agent #3 | 300 | 0.3 | 379.75 | 2 |

Table 3 depicted below shows the updated predictions for the three agents when the occupancy relevance factor is set to a lower value (i.e., α=0.30).

TABLE 3

Third Approach (α = 0.30)

|  | Prediction Score | Occupancy | Updated Score | Rank |
|---|---|---|---|---|
| Agent #1 | 100 | 0.8 | 131.58 | 1 |
| Agent #2 | 200 | 0.7 | 253.16 | 2 |
| Agent #3 | 300 | 0.3 | 329.67 | 3 |

Table 4 depicted below shows the updated predictions for the three agents when the occupancy relevance factor is set to its maximum value (i.e., α=1.0). It will be appreciated that the data in Table 4 is identical to the data in Table 1.

TABLE 4

Third Approach (α = 1.00)

|  | Prediction Score | Occupancy | Updated Score | Rank |
|---|---|---|---|---|
| Agent #1 | 100 | 0.8 | 500.00 | 2 |
| Agent #2 | 200 | 0.7 | 666.67 | 3 |
| Agent #3 | 300 | 0.3 | 428.57 | 1 |

It should be appreciated that the user-modifiable occupancy relevance factor (i.e., weighting factor) in the third approach allows administrators to flexibly balance a target KPI with an occupancy metric.

As described above, in some embodiments, the system may utilize a metric that serves as a proxy for occupancy. In particular, in some embodiments, the system may utilize the agent idle time as a proxy for occupancy in manner consistent with the techniques described herein. For example, in some embodiments, whichever agent has the largest idle time, that agent is moved to the top of the ranked list, and the agent with the smallest idle time gets moved to the bottom of the ranked list. So if the idle times are (A:5, B:50, C:500), then after rescoring, the order of agents in the list of scores will be (C:<new_score>, B:700, A:<new_score>). If the idle times are (A:500, B:5, C:50), then after rescoring, the order of agents in the list of scores will be (A:<new_score>, C:400, B:<new_score>). If idle times are (A:500, B:50, C:5), then after rescoring, the order of agents in the list of scores will be (A:<new_score>, B:700, C:<new_score>). In another embodiment, the system may utilize levels for workload balancing (e.g., from 1 to 5) that will determine the percentage of agents to be re-scored under the hood. For example, in some embodiments, the percentage may be determined by the formula ((level*2)−1)*10. In yet other embodiments, it should be appreciated that the system may utilize another reliable metric for agent workload volume in a manner consistent with the techniques described herein.

What is claimed is:

1. A system for routing interactions to contact center agents, the system comprising:
   at least one processor; and
   at least one memory comprising a plurality of instructions stored therein that, in response to execution by the at least one processor, causes the system to:
   identify an interaction to be routed to a contact center agent;
   identify a group of contact center agents as candidates for routing of the interaction;
   retrieve agent performance data for each candidate agent of the group of contact center agents identified as candidates for routing of the interaction;
   determine a predicted score for a key performance indicator for each candidate agent based on the agent performance data;
   determine an occupancy rate of each candidate agent based on the agent performance data;
   generate a ranking of the candidate agents for routing prioritization based on the predicted score for the key performance indicator for each candidate agent and the occupancy rate of each candidate agent; and
   signal a routing device to route the interaction to a selected candidate agent based on the ranking of the candidate agents,
   wherein to generate the ranking of the candidate agents for routing prioritization comprises to:
   generate a modified predicted score for each candidate agent based on the predicted score for the key performance indicator and the occupancy rate for the corresponding candidate agent and rank the candidate agents for routing prioritization based on the modified predicted score for each candidate agent.

2. The system of claim 1, wherein to generate the modified predicted score for a corresponding candidate agent comprises to:
increase the predicted score for the corresponding candidate agent in response to a determination that the occupancy rate of the corresponding candidate agent is less than a first threshold; and
decrease the predicted score for the corresponding candidate agent in response to a determination that the occupancy rate of the corresponding candidate agent is greater than a second threshold.

3. The system of claim 1, wherein to generate the modified predicted score for a corresponding candidate agent comprises to:
multiply the predicted score for the corresponding candidate agent by a real number greater than one in response to a determination that the occupancy rate of the corresponding candidate agent is less than a first threshold; and
multiply the predicted score for the corresponding candidate agent by a real number between zero and one in response to a determination that the occupancy rate of the corresponding candidate agent is greater than a second threshold.

4. The system of claim 1, wherein to generate the modified predicted score for a corresponding candidate agent comprises to divide the predicted score for the corresponding candidate agent by an availability rate of the corresponding candidate agent; and
wherein the availability rate of the corresponding candidate agent is equal to one minus the occupancy rate of the corresponding candidate agent.

5. The system of claim 1, wherein to generate the modified predicted score for a corresponding candidate agent comprises to:
multiply the occupancy rate of the corresponding candidate by a weighting factor to generate a modified occupancy rate for the corresponding candidate agent;
calculate a modified availability rate of the corresponding candidate agent as one minus the modified occupancy rate of the corresponding candidate agent; and
divide the predicted score for the corresponding candidate agent by the modified availability rate of the corresponding candidate agent.

6. The system of claim 5, wherein the system comprises a contact center system; and
wherein the weighting factor is modifiable by an administrator of the contact center system.

7. The system of claim 1, wherein the key performance indicator of a corresponding candidate agent comprises an average handle time (AHT) of the candidate agent.

8. The system of claim 1, wherein the predicted score for the key performance indicator is a normalized value between zero and one hundred.

9. A method of routing interactions to contact center agents in a contact center system, the method comprising:
identifying an interaction to be routed to a contact center agent;
identifying a group of contact center agents as candidates for routing of the interaction;
retrieving agent performance data for each candidate agent of the group of contact center agents identified as candidates for routing of the interaction;
determining a predicted score for a key performance indicator for each candidate agent based on the agent performance data;
determining an occupancy rate of each candidate agent based on the agent performance data;
generating a ranking of the candidate agents for routing prioritization based on the predicted score for the key performance indicator for each candidate agent and the occupancy rate of each candidate agent; and
signaling a routing device to route the interaction to a selected candidate agent based on the ranking of the candidate agents,
wherein generating the ranking of the candidate agents for routing prioritization comprises:
generating a modified predicted score for each candidate agent based on the predicted score for the key performance indicator and the occupancy rate for the corresponding candidate agent and ranking the candidate agents for routing prioritization based on the modified predicted score for each candidate agent.

10. The method of claim 9, wherein generating the modified predicted score for a corresponding candidate agent comprises:
increasing the predicted score for the corresponding candidate agent in response to determining that the occupancy rate of the corresponding candidate agent is less than a first threshold; and
decreasing the predicted score for the corresponding candidate agent in response to determining that the occupancy rate of the corresponding candidate agent is greater than a second threshold.

11. The method of claim 9, wherein generating the modified predicted score for a corresponding candidate agent comprises:
multiplying the predicted score for the corresponding candidate agent by a real number greater than one in response to determining that the occupancy rate of the corresponding candidate agent is less than a first threshold; and
multiplying the predicted score for the corresponding candidate agent by a real number between zero and one in response to determining that the occupancy rate of the corresponding candidate agent is greater than a second threshold.

12. The method of claim 10, wherein generating the modified predicted score for a corresponding candidate agent comprises dividing the predicted score for the corresponding candidate agent by an availability rate of the corresponding candidate agent; and
wherein the availability rate of the corresponding candidate agent is equal to one minus the occupancy rate of the corresponding candidate agent.

13. The method of claim 10, wherein generating the modified predicted score for a corresponding candidate agent comprises:
multiplying the occupancy rate of the corresponding candidate by a weighting factor to generate a modified occupancy rate for the corresponding candidate agent;
calculating a modified availability rate of the corresponding candidate agent as one minus the modified occupancy rate of the corresponding candidate agent; and
dividing the predicted score for the corresponding candidate agent by the modified availability rate of the corresponding candidate agent.

14. The method of claim 13, further comprising modifying the weighting factor by an administrator of the contact center system.

15. The method of claim 9, wherein the key performance indicator of a corresponding candidate agent comprises an average handle time (AHT) of the candidate agent.

16. The method of claim 9, wherein the predicted score for the key performance indicator is a normalized value between zero and one hundred.

17. One or more non-transitory machine readable storage media comprising a plurality of instructions stored thereon that, in response to execution by a system, causes the system to:
- identify an interaction to be routed to a contact center agent;
- identify a group of contact center agents as candidates for routing of the interaction;
- retrieve agent performance data for each candidate agent of the group of contact center agents identified as candidates for routing of the interaction;
- determine a predicted score for a key performance indicator for each candidate agent based on the agent performance data;
- determine an occupancy rate of each candidate agent based on the agent performance data;
- generate a ranking of the candidate agents for routing prioritization based on the predicted score for the key performance indicator for each candidate agent and the occupancy rate of each candidate agent; and
- signal a routing device to route the interaction to a selected candidate agent based on the ranking of the candidate agents,
  - wherein to generate the ranking of the candidate agents for routing prioritization comprises to:
    - generate a modified predicted score for each candidate agent based on the predicted score for the key performance indicator and the occupancy rate for the corresponding candidate agent and rank the candidate agents for routing prioritization based on the modified predicted score for each candidate agent.

* * * * *